United States Patent
Tsukui

(10) Patent No.: US 12,172,232 B2
(45) Date of Patent: Dec. 24, 2024

(54) LASER WELDING METHOD AND LASER WELDING APPARATUS

(71) Applicant: TOYOTA JIDOSHA KABUSHIKI KAISHA, Toyota (JP)

(72) Inventor: Akira Tsukui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 881 days.

(21) Appl. No.: 17/213,998

(22) Filed: Mar. 26, 2021

(65) Prior Publication Data
US 2021/0213563 A1 Jul. 15, 2021

Related U.S. Application Data

(62) Division of application No. 15/958,147, filed on Apr. 20, 2018, now Pat. No. 11,420,290.

(30) Foreign Application Priority Data

Apr. 28, 2017 (JP) .................................. 2017-089201

(51) Int. Cl.
*B23K 26/24* (2014.01)
*B23K 26/06* (2014.01)
(Continued)

(52) U.S. Cl.
CPC .......... *B23K 26/24* (2013.01); *B23K 26/0608* (2013.01); *B23K 26/064* (2015.10);
(Continued)

(58) Field of Classification Search
CPC .. B23K 26/24; B23K 26/0648; B23K 26/082; B23K 26/704; G02B 5/1828
See application file for complete search history.

(56) References Cited

U.S. PATENT DOCUMENTS 7,510,620 B2 3/2009 Terada et al.
2006/0255019 A1 11/2006 Martukanitz et al.
(Continued)

FOREIGN PATENT DOCUMENTS

CN 105171239 A 12/2015
DE 102004050819 A1 4/2006
(Continued)

OTHER PUBLICATIONS

JP-2016107293-A English translation (Year: 2016).*
(Continued)

*Primary Examiner* — Geoffrey S Evans
(74) *Attorney, Agent, or Firm* — Sughrue Mion, PLLC

(57) ABSTRACT

A laser welding method includes a welding process of irradiating a multiple laser beam so as to weld together a first member and a second member at a boundary. The multiple laser beam includes a first beam that is advanced while forming a first molten pool in which the first member is melted, a second beam that is advanced while forming a second molten pool in which the second member is melted, and a main beam that is advanced subsequently to the first beam and the second beam and irradiated to an integrated molten pool formed by integration of the first molten pool and the second molten pool. The first beam and the second beam do not swing, while the main beam swings with respect to the boundary.

2 Claims, 21 Drawing Sheets

(51) Int. Cl.
  B23K 26/064   (2014.01)
  B23K 26/067   (2006.01)
  B23K 26/082   (2014.01)
  B23K 26/70    (2014.01)
  B23K 101/36       (2006.01)
  B23K 101/38       (2006.01)
  B23K 103/10       (2006.01)
  H01M 10/058       (2010.01)
  H01M 50/169       (2021.01)

(52) U.S. Cl.
  CPC ...... B23K 26/0648 (2013.01); B23K 26/0673 (2013.01); B23K 26/082 (2015.10); B23K 26/704 (2015.10); B23K 2101/36 (2018.08); B23K 2101/38 (2018.08); B23K 2103/10 (2018.08); H01M 10/058 (2013.01); H01M 50/169 (2021.01)

(56) References Cited

U.S. PATENT DOCUMENTS

| 2008/0047939 | A1  | 2/2008  | Hummelt |
| 2015/0183058 | A1  | 7/2015  | Sugiyama et al. |
| 2015/0200386 | A1  | 7/2015  | Harayama et al. |
| 2015/0260985 | A1* | 9/2015  | Kitamura ............. G02B 5/3083 359/206.1 |
| 2015/0360320 | A1* | 12/2015 | Yoshida ............... B23K 26/206 219/121.64 |
| 2016/0250717 | A1  | 9/2016  | Kruger et al. |
| 2017/0182599 | A1  | 6/2017  | Tsukui |
| 2018/0311768 | A1  | 11/2018 | Tsukui |

FOREIGN PATENT DOCUMENTS

| DE | 102004050819 B4 |   | 5/2010  |           |
| JP | 2012-110905 A   |   | 6/2012  |           |
| JP | 2015-147219 A   |   | 8/2015  |           |
| JP | 2015-147220 A   |   | 8/2015  |           |
| JP | 2015-174100 A   |   | 10/2015 |           |
| JP | 2016-002562 A   |   | 1/2016  |           |
| JP | 2016107293 A    | * | 6/2016  |           |
| JP | 2016209925 A    | * | 12/2016 |           |
| JP | 2017-104883 A   |   | 6/2017  |           |
| JP | 2017-113785 A   |   | 6/2017  |           |
| KR | 10-2015-0144286 A |   | 12/2015 |         |
| WO | WO-2016034204 A1 | * | 3/2016 | ......... B23K 26/0608 |
| WO | WO-2016034205 A1 | * | 3/2016 | ......... B23K 26/0608 |

OTHER PUBLICATIONS

JP-2016209925-A English translation (Year: 2016).*
WO-2016034204-A1 English translation (Year: 2016).*
WO-2016034205-A1 English translation (Year: 2016).*
Communication dated Jan. 7, 2022 from the U.S. Patent & Trademark Office in U.S. Appl. No. 15/958,147.
Communication dated Jul. 12, 2021, from the United States Patent and Trademark Office in U.S. Appl. No. 15/958,147.
Notice of Allowance issued May 5, 2022 in U.S. Appl. No. 15/958,147.
Corrected Notice of Allowance issued May 25, 2022 in U.S. Appl. No. 15/958,147.

* cited by examiner

LASER WELDING METHOD AND LASER WELDING APPARATUS

INCORPORATION BY REFERENCE

This is a divisional of U.S. application Ser. No. 15/958,147 filed on Apr. 20, 2018, which claims priority to Japanese Patent Application No. 2017-089201 filed on Apr. 28, 2017, the disclosure of which, including the specification, drawings and abstract are incorporated herein by reference in its entirety.

BACKGROUND

1. Technical Field

The disclosure relates to a laser welding method for welding two members together and to a laser welding apparatus that is used in the laser welding method.

2. Description of Related Art

It is known that laser welding is used for welding two members together, and a laser welding apparatus for laser welding is also known. As the two members that are joined together by laser welding, there can be cited, for example, a case body and a lid that closes an opening of the case body, in a secondary battery including a box-shaped metal case. As to laser welding of such members, Japanese Unexamined Patent Application Publication No. 2016-2562 (JP 2016-2562 A), for example, discloses a technique of performing laser welding at high speed using a first laser irradiation means and a second laser irradiation means while preventing "laser-passing".

In this specification, "laser-passing" refers to a phenomenon that part of a laser beam passes through a gap forming a boundary between a first member and a second member and reaches the inside of the first member (e.g. the inside of the case body) or the back side of the second member (e.g. the back side of the lid). When the "laser-passing" occurs, there is a possibility that the laser beam is directly irradiated to or its reflected light is irradiated to, for example, an electrode body disposed in the case to cause a failure such as a burnout, and therefore, the occurrence of "laser-passing" is undesirable.

SUMMARY

However, when the first member and the second member are joined together by laser welding including the case where the laser welding is performed using the technique described in JP 2016-2562 A, there occurs a case where the strength of a welded portion with solidified molten metal becomes partially low. This may be caused by the fact that, for example, as shown in FIG. 21, when a first boundary portion BE1 of a first member B1 and a second boundary portion BE2 of a second member B2 are welded together, a film-like oxide layer MOL extending as a film is present in a welded portion YB formed by welding the first boundary portion BE1 and the second boundary portion BE2 together, and that when stress is applied to the first member B1 and the second member B2, cracks tend to occur in the welded portion YB, starting from end portions of the film-like oxide layer MOL.

Before the welding, a first boundary surface BS1 of the first boundary portion BE1 of the first member B1 and a second boundary surface BS2, facing the first boundary surface BS1, of the second boundary portion BE2 of the second member B2, shown in broken lines, are each formed with an oxide film (e.g. aluminum oxide $Al_2O_3$ when the first member B1 and the second member B2 are made of aluminum). The oxide (e.g. aluminum oxide) forming the oxide film has a melting point higher than the metal (e.g. aluminum) being the ground metal and thus is relatively difficult to melt during the laser welding. Therefore, it is considered that when the first boundary portion BE1 and the second boundary portion BE2 are melted and welded together using a laser beam, part of the oxide film forming the first boundary surface BS1 or the second boundary surface BS2 or part of the oxide films forming both first and second boundary surfaces BS1, BS2 may remain unmelted and appear as the film-like oxide layer MOL in the welded portion YB depending on a welding state.

The disclosure provides a laser welding method that can perform laser welding with high reliability, and a laser welding apparatus that is used in the laser welding method.

A first aspect of the disclosure relates to a laser welding method that disposes a first boundary portion of a first member and a second boundary portion of a second member such that a first boundary surface of the first boundary portion and a second boundary surface of the second boundary portion face each other, the first boundary portion and the second boundary portion extending along a boundary between the first member and the second member, and then moves an irradiation position of a multiple laser beam in an advancing direction along the boundary so as to melt the first boundary portion and the second boundary portion, thereby welding the first member and the second member together. The multiple laser beam includes a first beam that is irradiated to the first boundary portion of the first member and advanced in the advancing direction along the boundary while melting the first boundary portion, a second beam that is irradiated to the second boundary portion of the second member and advanced in the advancing direction along the boundary synchronously with the first beam while melting the second boundary portion, and a main beam that has an energy higher than an energy of each of the first beam and the second beam and is advanced in the advancing direction along the boundary subsequently to and synchronously with the first beam and the second beam and irradiated to an integrated molten pool formed by integration of a first molten pool in which the first boundary portion is melted by the first beam, and a second molten pool in which the second boundary portion is melted by the second beam. The multiple laser beam is irradiated to the first boundary portion of the first member and the second boundary portion of the second member with the first boundary surface and the second boundary surface facing each other, thereby welding the first member and the second member together. Further, the first beam and the second beam do not swing, while the main beam swings with respect to the boundary.

In this laser welding method, the first boundary portion and the second boundary portion are melted by the first beam and the second beam to form the first molten pool and the second molten pool, and subsequently, the main beam is irradiated to the integrated molten pool in which the first molten pool and the second molten pool are integrated together. Therefore, a phenomenon that the main beam passes through the gap so that the laser light reaches to the opposite side (e.g. the inside of a case formed by the first member and the second member, the back side of the first member and the second member) (hereinafter this phenomenon may also be referred to as "laser-passing") is unlikely to occur. Further, the first member and the second member can be properly welded together by deeply melting portions, near the boundary, of the first boundary portion and the second boundary portion. In addition, since the first beam and the second beam do not swing, it is possible to suppress the occurrence of laser-passing such that the first beam or the second beam is offset from the first boundary portion and the second boundary portion by beam swing so as to be irradiated to the gap. On the other hand, the main beam swings with respect to the boundary. Then, the main beam is advanced in the advancing direction along the boundary while swinging, so that the integrated molten pool is stirred. Therefore, oxide films formed on the first boundary surface of the first boundary portion and the second boundary surface of the second boundary portion are unlikely to remain unmelted as a film in the integrated molten pool, and therefore, a film-like oxide layer that tends to partition part of a solidified welded portion and to cause breakage of the welded portion is unlikely to be formed, so that highly reliable laser welding is made possible.

The first member and the second member are members that are welded together by laser welding. For example, there can be cited a case body of a secondary battery and a lid that closes an opening portion of the case body, but not limited thereto. There can be cited various members that are joined together by laser welding. The first boundary portion of the first member and the second boundary portion of the second member represent portions, disposed sandwiching the boundary and close to the boundary, of the first member and the second member and are portions that are welded together by melting the first boundary portion and the second boundary portion. In the example of the case body of the secondary battery and the lid that closes the opening portion of the case body, there can be cited the opening portion of the case body and a peripheral edge portion of the lid, that are disposed sandwiching the boundary between the case body and the lid. Further, the first boundary surface of the first boundary portion and the second boundary surface of the second boundary portion are surfaces, facing each other, of the first boundary portion and the second boundary portion. In the example of the case body of the secondary battery and the lid that closes the opening portion of the case body, there can be cited an opening inner side surface, facing the peripheral edge portion of the lid, of the opening portion of the case body, and a peripheral edge surface, facing the opening inner side surface of the opening portion of the case body, of the peripheral edge portion of the lid. Further, there can be cited an opening end face of the opening portion of the case body and a peripheral edge portion lower surface, facing the opening end face of the opening portion of the case body, of the peripheral edge portion of the lid. A portion between the first boundary surface and the second boundary surface servers as the boundary.

As a laser light source for producing a laser beam, it is possible to use a fiber laser, a CO2 laser, a YAG laser, or the like. The laser beam that is irradiated to the first member and the second member is the multiple laser beam including the first beam, the second beam, and the main beam that is advanced in the advancing direction along the boundary subsequently to the first and second beams. Therefore, the multiple laser beam may further include other laser beams such as a laser beam that is advanced in the advancing direction along the boundary subsequently to the main beam. The first beam, the second beam, and the main beam may each be composed of a single laser beam or a plurality of laser beams. For example, the first beam and the second beam may each be composed of two laser beams. Further, the main beam may be composed of two or four laser beams. Laser beams emitted from a plurality of laser light sources may be used simultaneously to form a multiple laser beam as a bundle of laser beams. On the other hand, using the diffractive optical element, a plurality of laser beams obtained from a single laser beam may be used as laser beams forming a part of a multiple laser beam.

The advancing direction along the boundary in which the irradiation position of the laser beam is moved is a direction, in which the irradiation position is advanced, among directions in which the boundary between the first boundary portion and the second boundary portion extends. The direction in which the irradiation position of the laser beam swings may be any direction with respect to the boundary as long as the irradiation position is within a range of the integrated molten pool. For example, it may be a boundary perpendicular direction perpendicular to the boundary, an advancing direction being a direction in which the boundary extends, or a direction that obliquely crosses these directions. Further, it is possible to employ swing of circular movement or oval movement that simultaneously causes swing in two directions, i.e. the boundary perpendicular direction and the advancing direction along the boundary.

In the laser welding method described above, when performing the welding, the main beam may swing across the boundary in a boundary perpendicular direction that is perpendicular to the boundary.

In this laser welding method, the main beam swings across the boundary in the boundary perpendicular direction. Therefore, while the main beam is advanced in the advancing direction along the boundary, the integrated molten pool is stirred so as to cut oxide films floating in the integrated molten pool, which were formed on the first boundary surface of the first boundary portion and the second boundary surface of the second boundary portion, by the swing of the main beam in the boundary perpendicular direction. Therefore, a film-like oxide layer that tends to cause breakage of the welded portion is particularly difficult to remain in the solidified welded portion, so that more reliable laser welding is made possible. In order to allow the main beam to swing across the boundary in the boundary perpendicular direction, the arrangement of a laser welding apparatus and the first and second members should be considered such that the direction in which the main beam swings coincides with the boundary perpendicular direction.

In the laser welding method described above, use may be made of a laser welding apparatus including a light source portion configured to form a parallel laser beam, an element portion including a diffractive optical element member and configured to form the multiple laser beam from the parallel laser beam incident on the diffractive optical element member, a condensing portion configured to condense the multiple laser beam, and a deflecting portion configured to deflect the multiple laser beam. The diffractive optical element member may include an element forming portion formed with a diffractive optical element, a first non-forming portion that is disposed adjacent to the element forming portion on a first side in a moving direction of the element forming portion and is not formed with the diffractive optical element, and a second non-forming portion that is disposed adjacent to the element forming portion on a second side opposite to the first side in the moving direction of the element forming portion and is not formed with the diffractive optical element. The element forming portion may be configured to emit a diffracted multiple beam from the incident parallel laser beam using the diffractive optical element, the diffracted multiple beam composed of a plurality of beams including the first beam and the second beam in the multiple laser beam. The first non-forming portion may be configured to emit a first transmitted beam as at least a part of the main beam of the multiple laser beam, the first transmitted beam being the incident parallel laser beam having passed through the first non-forming portion without being diffracted. The second non-forming portion may be configured to emit a second transmitted beam as at least a part of the main beam of the multiple laser beam, the second transmitted beam being the incident parallel laser beam having passed through the second non-forming portion without being diffracted. The element portion may include a rectilinear moving portion configured to linearly reciprocate the diffractive optical element member in the moving direction between a first position where the parallel laser beam is irradiated to a portion overlapping the first non-forming portion and the element forming portion such that the multiple laser beam including the first transmitted beam forming at least the part of the main beam and the diffracted multiple beam is emitted, and a second position where the parallel laser beam is irradiated to a portion overlapping the element forming portion and the second non-forming portion such that the multiple laser beam including the diffracted multiple beam and the second transmitted beam forming at least the part of the main beam is emitted. The rectilinear moving portion may be driven to linearly reciprocate the diffractive optical element member between the first position and the second position, and the multiple laser beam may be condensed in a front-focus defocused state or a rear-focus defocused state with respect to the first boundary portion of the first member and the second boundary portion of the second member so as to irradiate the multiple laser beam to the first boundary portion of the first member and the second boundary portion of the second member, thereby welding together the first boundary portion of the first member and the second boundary portion of the second member.

In the laser welding method described above, the diffractive optical element member in which the first non-forming portion and the second non-forming portion are formed on both sides, in the moving direction, of the element forming portion formed with the diffractive optical element is used, and the diffractive optical element member is linearly reciprocated by the rectilinear moving portion between the first position where the parallel laser beam is irradiated to a portion overlapping the first non-forming portion and the element forming portion, and the second position where the parallel laser beam is irradiated to a portion overlapping the element forming portion and the second non-forming portion. Consequently, the first transmitted beam and the second transmitted beam are alternately included in the main beam of the multiple laser beam that is irradiated to the first member and the second member. When the first transmitted beam and the second transmitted beam are condensed to the focal point, the first transmitted beam and the second transmitted beam are irradiated toward the focal point from opposite directions sandwiching the optical axis.

When condensed to the focal point, the first transmitted beam and the second transmitted beam are condensed to the same position (focal point). However, in the laser welding method described above, the multiple laser beam is condensed in a front-focus defocused state or a rear-focus defocused state with respect to the first boundary portion of the first member and the second boundary portion of the second member. Therefore, the positions where the first transmitted beam and the second transmitted beam hit the first member and the second member (irradiation plane) are opposite to each other with respect to the position where the optical axis hits the irradiation plane. Since the first transmitted beam and the second transmitted beam are alternately included in the main beam due to the linear reciprocating movement of the diffractive optical element member by the rectilinear moving portion, it seems as if the main beam in its entirety also swings linearly on the irradiation plane with respect to the position where the optical axis crosses the irradiation plane. On the other hand, differently from the main beam in which the transmitted beam is included, the first beam, the second beam, and the like are beams of primary light or secondary light, produced by the diffractive optical element, in the diffracted multiple beam, so that the positions thereof do not change by the movement of the element forming portion.

In this laser welding method, since the laser welding is performed by producing the multiple laser beam, including the main beam that swings, from the parallel laser beam by the above-described laser welding apparatus, it is not necessary to produce a multiple laser beam using a number of laser light sources, so that the optical configuration can be made simple.

As the light source portion for forming a parallel laser beam being parallel light, it is possible to use an appropriate optical system. For example, there can be cited an optical system including a laser light source and a collimator that shapes laser light, emitted from the laser light source, into a parallel laser beam. The condensing portion is an optical system that condenses a multiple laser beam to a focal position on a focal plane, and is formed by, for example, an objective lens and the like. The deflecting portion is a portion that deflects the optical axis of a multiple laser beam, for example, advances the irradiation position of a multiple laser beam in the advancing direction along the boundary. There can be cited, for example, a deflecting portion using a galvano scanner and the like. Two galvano scanners may be combined to deflect the irradiation position of a multiple laser beam in the X-direction and the Y-direction. As the laser welding apparatus, it is possible to use a so-called 3D galvano scanner in which a rectilinear moving portion is provided in an element portion.

As the diffractive optical element that is provided in the element forming portion of the diffractive optical element member, there can be cited one formed with a pattern that produces one or a plurality of first beams and one or a plurality of second beams from an irradiated parallel laser beam, one formed with a pattern that produces a part of a main beam in addition to the first and second beams, and one formed with a pattern that produces other beams in addition to the first and second beams. As beams that are emitted from the diffractive optical element, primary light, secondary light, and the like are used in addition to zero-order light that is emitted (transmitted) without being diffracted, although it depends on an element pattern. On the other hand, no diffractive optical element is formed in either of the first non-forming portion and the second non-forming portion of the diffractive optical element member, so that the incident parallel laser beam passes therethrough.

As a technique of condensing the multiple laser beam in a front-focus defocused state or a rear-focus defocused state with respect to the first boundary portion of the first member and the second boundary portion of the second member, the arrangement of the first member and the second member relative to the laser welding apparatus may be adjusted so that the focal position of the multiple laser beam that is condensed by the condensing portion becomes front focus or rear focus with respect to the first boundary portion of the first member and the second boundary portion of the second member. When the 3D galvano scanner is used as the laser welding apparatus, focal point adjustment to front focus or rear focus may be performed by a focal position moving portion (Z-lens) that changes the focal position, to which the condensing portion condenses the multiple laser beam, in the optical axis direction along the optical axis of the multiple laser beam. The front focus represents a state in which the focal point of the multiple laser beam that is irradiated is located on the shallow side (light source side) compared to the first boundary portion of the first member and the second boundary portion of the second member, while the rear focus represents a state in which the focal point is located on the deep side (the side away from the light source) compared to the first boundary portion and the second boundary portion.

In the laser welding method of the first aspect, use may be made of a laser welding apparatus including a light source portion configured to form a parallel laser beam, an element portion including a diffractive optical element member and configured to form the multiple laser beam from the parallel laser beam incident on the diffractive optical element member, a condensing portion configured to condense the multiple laser beam, and a deflecting portion configured to deflect the multiple laser beam. The diffractive optical element member may include an element forming portion formed with a diffractive optical element, and a non-forming portion that surrounds the element forming portion and is not formed with the diffractive optical element. The element forming portion may be configured to emit a diffracted multiple beam from the incident parallel laser beam using the diffractive optical element, the diffracted multiple beam composed of a plurality of beams including the first beam and the second beam in the multiple laser beam. The non-forming portion may be annular and may be configured to emit a transmitted beam as at least a part of the main beam of the multiple laser beam, the transmitted beam being the incident parallel laser beam having passed through the non-forming portion without being diffracted. The diffractive optical element member may be disposed such that the parallel laser beam is irradiated to a portion overlapping the element forming portion being circular and the non-forming portion in a circumferential direction. The element portion may include a circularly moving portion configured to circularly move the diffractive optical element member around an optical axis of the parallel laser beam without rotating the diffractive optical element member itself. The circularly moving portion may be driven to circularly move the diffractive optical element member, and the multiple laser beam may be condensed in a front-focus defocused state or a rear-focus defocused state with respect to the first boundary portion of the first member and the second boundary portion of the second member so as to irradiate the multiple laser beam to the first boundary portion of the first member and the second boundary portion of the second member while circularly moving the main beam, thereby welding together the first boundary portion of the first member and the second boundary portion of the second member.

In the laser welding method described above, the diffractive optical element member in which the annular non-forming portion is formed around the element forming portion formed with the diffractive optical element is used, the diffractive optical element member is disposed such that the parallel laser beam is irradiated to a portion overlapping the annular non-forming portion and the element forming portion, and the diffractive optical element member is circularly moved around the optical axis of the parallel laser beam without being rotated. Consequently, the transmitted beam is always included in the main beam of the multiple laser beam that is irradiated to the first member and the second member. Further, since the diffractive optical element member is circularly moved, the transmitted beam is condensed toward the focal point from a position spaced apart from the optical axis of the multiple laser beam, and further, the transmitted beam is condensed toward the focal point while revolving around the optical axis of the multiple laser beam.

At the focal point, the transmitted beam is condensed to the same position (focal point) from any position. However, in the laser welding method described above, the multiple laser beam is condensed in a front-focus defocused state or a rear-focus defocused state with respect to the first boundary portion of the first member and the second boundary portion of the second member. Then, since the transmitted beam is irradiated to the first member and the second member while revolving around the optical axis of the multiple laser beam, the main beam in its entirety, including the transmitted beam, is also advanced while revolving due to the circular movement of the diffractive optical element member by the circularly moving portion, i.e. it seems as if the main beam in its entirety swings in the boundary perpendicular direction and in the advancing direction along the boundary.

Also in this laser welding method, since the laser welding is performed by producing the multiple laser beam, including the main beam that swings so as to revolve, from the parallel laser beam by the above-described laser welding apparatus, it is not necessary to produce a multiple laser beam using a number of laser light sources, so that the optical configuration can be made simple. Further, since the main beam swings so as to revolve, it is possible to suppress the formation of a film-like oxide layer in a welded portion by swinging the main beam without being affected by selection of the advancing direction of the multiple laser beam.

Description of the light source portion, the condensing portion, the deflecting portion, the diffractive optical element (DOE), the adjustment of front focus or rear focus, and the like is the same as described above. Further, as the laser welding apparatus, it is possible to use a 3D galvano scanner in which a circularly moving portion is provided in an element portion.

In the laser welding method of the first aspect, use may be made of a laser welding apparatus including a light source portion configured to form a parallel laser beam, an element portion including a diffractive optical element member and configured to form the multiple laser beam from the parallel laser beam incident on the diffractive optical element member, a condensing portion configured to condense the multiple laser beam, the condensing portion including a focal position moving portion configured to move a focal position, to which the multiple laser beam is condensed, in an optical axis direction along an optical axis of the multiple laser beam, and a deflecting portion configured to deflect the multiple laser beam. The diffractive optical element member may include an element forming portion formed with a diffractive optical element, and a non-forming portion that is disposed adjacent to the element forming portion and is not formed with the diffractive optical element. The element forming portion may be configured to emit a diffracted multiple beam from the incident parallel laser beam using the diffractive optical element, the diffracted multiple beam composed of a plurality of beams including the first beam and the second beam in the multiple laser beam. The non-forming portion may be configured to emit a transmitted beam as at least a part of the main beam of the multiple laser beam, the transmitted beam being the incident parallel laser beam having passed through the non-forming portion without being diffracted. The diffractive optical element member may be disposed such that the parallel laser beam is irradiated to a portion overlapping the element forming portion and the non-forming portion. The element portion may be configured to emit the multiple laser beam including the diffracted multiple beam and the transmitted beam forming at least the part of the main beam. The focal position moving portion may be driven so that the focal position to which the multiple laser beam is condensed is caused to be in a front focus state and a rear focus state alternately with respect to the first boundary portion of the first member and the second boundary portion of the second member, so as to irradiate the multiple laser beam to the first boundary portion of the first member and the second boundary portion of the second member, thereby welding together the first boundary portion of the first member and the second boundary portion of the second member.

In the laser welding method described above, the diffractive optical element member including the element forming portion formed with the diffractive optical element and the non-forming portion disposed adjacent to the element forming portion is used, and the diffractive optical element member is disposed such that the parallel laser beam is irradiated to a portion overlapping the element forming portion and the non-forming portion. Consequently, the transmission beam is included in the main beam. When condensed to the focal point, the transmitted beam produced by the non-forming portion is condensed toward the focal point from one side in the boundary perpendicular direction. In addition, in the laser welding method described above, the focal position moving portion is driven such that the focal position to which the multiple laser beam is condensed is caused to be in a front focus state and a rear focus state alternately with respect to the first boundary portion of the first member and the second boundary portion of the second member. Consequently, in the front focus state and the rear focus state, the irradiation positions of the transmitted beam on the first boundary portion of the first member and the second boundary portion of the second member become opposite to each other. Therefore, it seems as if the main beam in its entirety, including the first transmitted beam and the second transmitted beam alternately due to the driving of the focal position moving portion, also swings in the boundary perpendicular direction.

In this laser welding method, since the laser welding is performed by producing the multiple laser beam, including the main beam that swings, from the parallel laser beam by the above-described laser welding apparatus, it is not necessary to produce a multiple laser beam using a number of laser light sources, so that the optical configuration can be made simple. Further, since it is not necessary to provide the element portion with a movable portion such as the rectilinear moving portion, the optical configuration can be made further simple in this regard.

Description of the light source portion, the condensing portion, the deflecting portion, the diffractive optical element (DOE), the adjustment of front focus or rear focus, and the like is the same as described above. The focal position moving portion is a portion that moves the focal position, to which the multiple laser beam is condensed, in the optical axis direction along the optical axis of the multiple laser beam. There can be cited, for example, one having a convex lens and a mechanism that moves the focal position of the multiple laser beam in the optical axis direction by the movement of the convex lens in the optical axis direction, and therefore, for example, a Z-lens in a 3D galvano scanner can be cited. That is, as the laser welding apparatus, it is possible to use a 3D galvano scanner including a focal position moving portion (Z-lens).

In the laser welding method described above, the element forming portion of the diffractive optical element member may be configured to emit, as at least a part of the multiple laser beam having passed through the element forming portion, the diffracted multiple beam composed of a plurality of beams including a zero-order light beam being zero-order light of the parallel laser beam and forming a part of the main beam, in addition to the first beam and the second beam, using the diffractive optical element formed in the element forming portion.

In this laser welding method, the diffracted multiple beam from the element forming portion includes the zero-order light beam forming a part of the main beam. That is, since the main beam includes the zero-order light beam in the multiple laser beam that is irradiated to the first boundary portion of the first member and the second boundary portion of the second member, the first boundary portion of the first member and the second boundary portion of the second member can be melted deeply (largely in the optical axis direction of the multiple laser beam) at the boundary between the first boundary portion and the second boundary portion, so that the first boundary portion of the first member and the second boundary portion of the second member can be welded together with high strength.

In the laser welding method described above, while the multiple laser beam is advanced in the advancing direction along the boundary, the main beam may be caused to swing in the advancing direction along the boundary at a frequency of three or more reciprocations per mm.

In this laser welding method, the swing of the main beam is performed in the advancing direction along the boundary at a frequency of three or more reciprocations per mm, and thus, the integrated molten pool is properly stirred. Therefore, a film-like oxide layer is particularly difficult to remain in the welded portion formed by solidification of the integrated molten pool, so that highly reliable laser welding is made possible.

The frequency of the swing may be set to a frequency of 20 or less reciprocations per mm. This is because when the frequency of the swing is too high, the influence of vibration of the rectilinear moving portion or the like due to the swing tends to be large, which is not preferable.

A second aspect of the disclosure relates to a laser welding apparatus including: a light source portion configured to form a parallel laser beam; an element portion including a diffractive optical element member and configured to form a multiple laser beam composed of a plurality of beams from the parallel laser beam incident on the diffractive optical element member; a condensing portion configured to condense the multiple laser beam; and a deflecting portion configured to deflect the multiple laser beam. The multiple laser beam includes at least a main beam, a first beam that has an energy lower than an energy of the main beam and is irradiated so as to be spaced apart from the main beam in a first obliquely front direction in an advancing direction of the multiple laser beam, and a second beam that has an energy lower than the energy of the main beam and is irradiated so as to be spaced apart from the main beam in a second obliquely front direction in the advancing direction of the multiple laser beam, the second obliquely front direction being a direction that is inclined to a side opposite to the first obliquely front direction in the advancing direction. The diffractive optical element member includes an element forming portion formed with a diffractive optical element, a first non-forming portion that is disposed adjacent to the element forming portion on a first side in a moving direction of the element forming portion and is not formed with the diffractive optical element, and a second non-forming portion that is disposed adjacent to the element forming portion on a second side opposite to the first side in the moving direction of the element forming portion and is not formed with the diffractive optical element. The element forming portion is configured to emit a diffracted multiple beam from the incident parallel laser beam using the diffractive optical element, the diffracted multiple beam composed of a plurality of beams including the first beam and the second beam in the multiple laser beam. The first non-forming portion is configured to emit a first transmitted beam as at least a part of the main beam of the multiple laser beam, the first transmitted beam being the incident parallel laser beam having passed through the first non-forming portion without being diffracted. The second non-forming portion is configured to emit a second transmitted beam as at least a part of the main beam of the multiple laser beam, the second transmitted beam being the incident parallel laser beam having passed through the second non-forming portion without being diffracted. The element portion includes a rectilinear moving portion configured to linearly reciprocate the diffractive optical element member in the moving direction between a first position where the parallel laser beam is irradiated to a portion overlapping the first non-forming portion and the element forming portion such that the multiple laser beam including the first transmitted beam forming at least the part of the main beam and the diffracted multiple beam is emitted, and a second position where the parallel laser beam is irradiated to a portion overlapping the element forming portion and the second non-forming portion such that the multiple laser beam including the diffracted multiple beam and the second transmitted beam forming at least the part of the main beam is emitted.

In this laser welding apparatus, the diffractive optical element member in which the first non-forming portion and the second non-forming portion are formed on both sides, in the moving direction, of the element forming portion formed with the diffractive optical element is used, and the diffractive optical element member is linearly reciprocated by the rectilinear moving portion between the first position where the parallel laser beam is irradiated to a portion overlapping the first non-forming portion and the element forming portion, and the second position where the parallel laser beam is irradiated to a portion overlapping the element forming portion and the second non-forming portion. Consequently, the first transmitted beam and the second transmitted beam are alternately included in the main beam of the multiple laser beam that is irradiated to the first member and the second member. When the first transmitted beam produced by the first non-forming portion and the second transmitted beam produced by the second non-forming portion are condensed to the focal point, the first transmitted beam and the second transmitted beam are irradiated toward the focal point from opposite directions sandwiching the optical axis of the multiple laser beam.

When condensed to the focal point, the first transmitted beam and the second transmitted beam are condensed to the same position (focal point). However, in the laser welding apparatus described above, when the multiple laser beam is condensed in a front-focus defocused state or a rear-focus defocused state with respect to the first member and the second member to be welded together, since the first transmitted beam and the second transmitted beam are alternately included in the main beam due to the linear reciprocating movement of the diffractive optical element member by the rectilinear moving portion, it seems as if the main beam in its entirety swings in a direction corresponding to the moving direction of the diffractive optical element member. On the other hand, differently from the main beam in which the transmitted beam is included, the first beam, the second beam, and the like are beams of primary light or secondary light, produced by the diffractive optical element, in the diffracted multiple beam and thus do not swing. Consequently, with this laser welding apparatus, the multiple laser beam, in which only the main beam swings in the direction corresponding to the moving direction of the diffractive optical element member while the first beam and the second beam do not swing, can be irradiated to the first member and the second member.

Further, in this laser welding apparatus, since the multiple laser beam, including the main beam that swings, is produced from the parallel laser beam, it is not necessary to produce a multiple laser beam using a number of laser light sources, so that the optical configuration can be made simple.

Description of the light source portion, the condensing portion, the deflecting portion, the diffractive optical element (DOE), the adjustment of front focus or rear focus, and the like is the same as described above. In a laser welding apparatus in which a deflecting portion uses only a single galvano scanner so that the advancing direction of a multiple laser beam deflected and advanced by this deflecting portion is limited to a particular direction (given as an X-direction), it is preferable to determine a relationship between a rectilinear moving portion and the deflecting portion so that the direction in which a main beam condensed in a defocused state swings by driving of the rectilinear moving portion becomes a direction (Y-direction) perpendicular to the advancing direction (X-direction) of the multiple laser beam. By irradiation of the multiple laser beam, an integrated molten pool formed by integration of a first molten pool formed by a first beam and a second molten pool formed by a second beam can be stirred so that an oxide film floating in the integrated molten pool is cut by the swinging main beam. Consequently, a film-like oxide layer is unlikely to be formed in a solidified welded portion, so that highly reliable laser welding is made possible. On the other hand, in a laser welding apparatus in which a deflecting portion can deflect the irradiation position of a multiple laser beam in X- and Y-directions by combining two galvano scanners so that the multiple laser beam deflected and advanced by this deflecting portion can be advanced in either of the X- and Y-directions, it is preferable to determine a relationship between a rectilinear moving portion and the deflecting portion so that the direction in which a main beam condensed in a defocused state swings by driving of the rectilinear moving portion becomes a direction (Y-direction or X-direction) perpendicular to a direction (X-direction or Y-direction, e.g. a direction deflected by one galvano scanner) that is set as a reference direction in the laser welding apparatus. When the multiple laser beam is advanced in the direction that is set as the reference direction in the laser welding apparatus in which the control of the deflecting portion is easy, an integrated molten pool formed by integration of a first molten pool formed by a first beam and a second molten pool formed by a second beam can be stirred so that an oxide film floating in the integrated molten pool is cut by the swinging main beam. Consequently, a film-like oxide layer is unlikely to be formed in a solidified welded portion, so that highly reliable laser welding is made possible.

A third aspect of the disclosure relates to a laser welding apparatus including: a light source portion configured to form a parallel laser beam; an element portion including a diffractive optical element member and configured to form a multiple laser beam composed of a plurality of beams from the parallel laser beam incident on the diffractive optical element member; a condensing portion configured to condense the multiple laser beam; and a deflecting portion configured to deflect the multiple laser beam. The multiple laser beam includes at least a main beam, a first beam that has an energy lower than an energy of the main beam and is irradiated so as to be spaced apart from the main beam in a first obliquely front direction in an advancing direction of the multiple laser beam, and a second beam that has an energy lower than the energy of the main beam and is irradiated so as to be spaced apart from the main beam in a second obliquely front direction in the advancing direction of the multiple laser beam, the second obliquely front direction being a direction that is inclined to a side opposite to the first obliquely front direction in the advancing direction. The diffractive optical element member includes an element forming portion formed with a diffractive optical element, and a non-forming portion that surrounds the element forming portion and is not formed with the diffractive optical element. The element forming portion is configured to emit a diffracted multiple beam from the incident parallel laser beam using the diffractive optical element, the diffracted multiple beam composed of a plurality of beams including the first beam and the second beam in the multiple laser beam. The non-forming portion is annular and is configured to emit a transmitted beam as at least a part of the main beam of the multiple laser beam, the transmitted beam being the incident parallel laser beam having passed through the non-forming portion without being diffracted. The diffractive optical element member is disposed such that the parallel laser beam is irradiated to a portion overlapping the element forming portion being circular and the non-forming portion in a circumferential direction, and the element portion includes a circularly moving portion configured to circularly move the diffractive optical element member around an optical axis of the parallel laser beam without rotating the diffractive optical element member itself.

In the laser welding apparatus described above, the diffractive optical element member in which the annular non-forming portion is formed around the element forming portion formed with the diffractive optical element is used, the diffractive optical element member is disposed such that the parallel laser beam is irradiated to a portion overlapping the annular non-forming portion and the element forming portion, and the diffractive optical element member is circularly moved around the optical axis of the parallel laser beam without being rotated. Consequently, the transmitted beam is always included in the main beam of the multiple laser beam that is irradiated to the first member and the second member. Further, since the diffractive optical element member is circularly moved, the transmitted beam is condensed toward the focal point from a position spaced apart from the optical axis of the multiple laser beam, and further, the transmitted beam is condensed toward the focal point while revolving around the optical axis of the multiple laser beam.

At the focal point, the transmitted beam is condensed to the same position (focal point) from any position. However, in the laser welding apparatus described above, when the multiple laser beam is condensed in a front-focus defocused state or a rear-focus defocused state with respect to the first member and the second member to be welded together, since the transmitted beam is irradiated to the first member and the second member while revolving around the optical axis of the multiple laser beam due to the circular movement of the diffractive optical element member by the circularly moving portion, the main beam in its entirety, including the transmitted beam, is also advanced while revolving. That is, it seems as if the main beam swings in the advancing direction and in the direction perpendicular to the advancing direction.

In this laser welding apparatus, since the multiple laser beam, including the main beam that swings, is produced from the parallel laser beam, it is not necessary to produce a multiple laser beam using a number of laser light sources, so that the optical configuration can be made simple. Further, since the main beam swings so as to revolve, it is possible to swing the main beam without being affected by selection of the advancing direction of the multiple laser beam.

Description of the light source portion, the condensing portion, the deflecting portion, the diffractive optical element (DOE), the adjustment of front focus or rear focus, and the like is the same as described above.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiment

Figure 1:
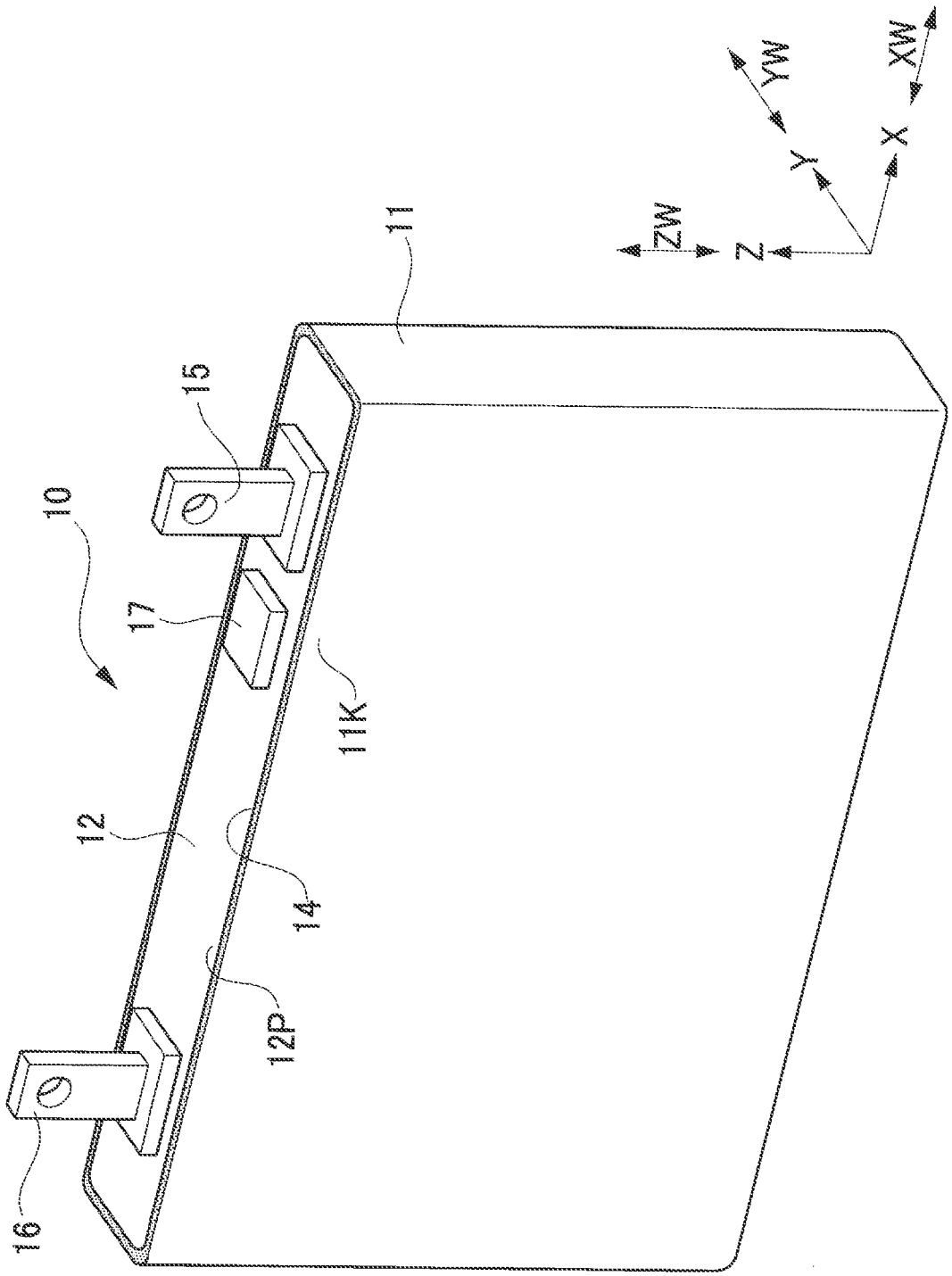
FIG. 1 is a perspective view of a battery to which laser welding is applied.
Figure 2:
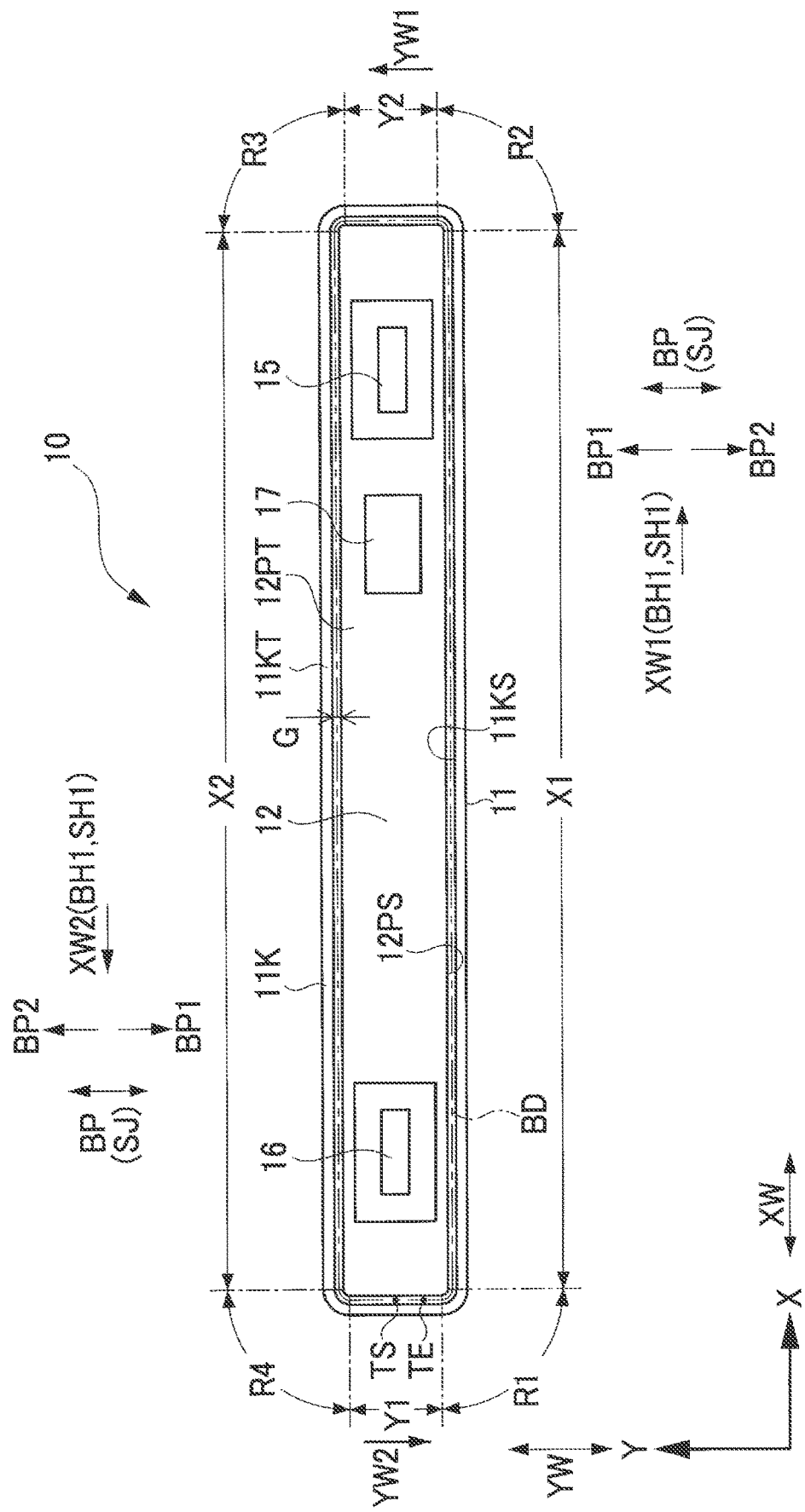
FIG. 2 is a top view of the battery before the welding.
Figure 3:
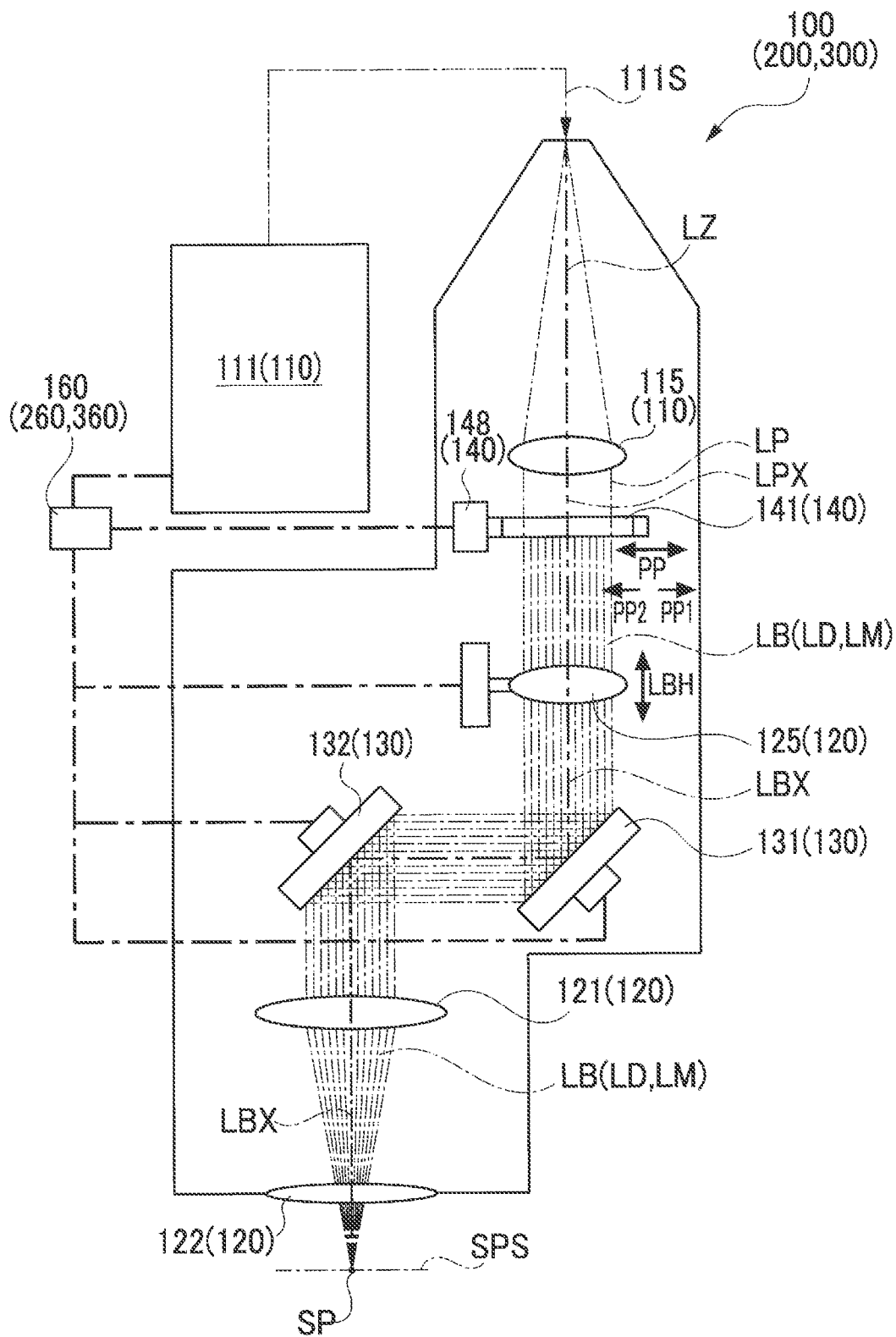
FIG. 3 is an explanatory diagram showing a schematic configuration of a laser welding apparatus.
Figure 4:
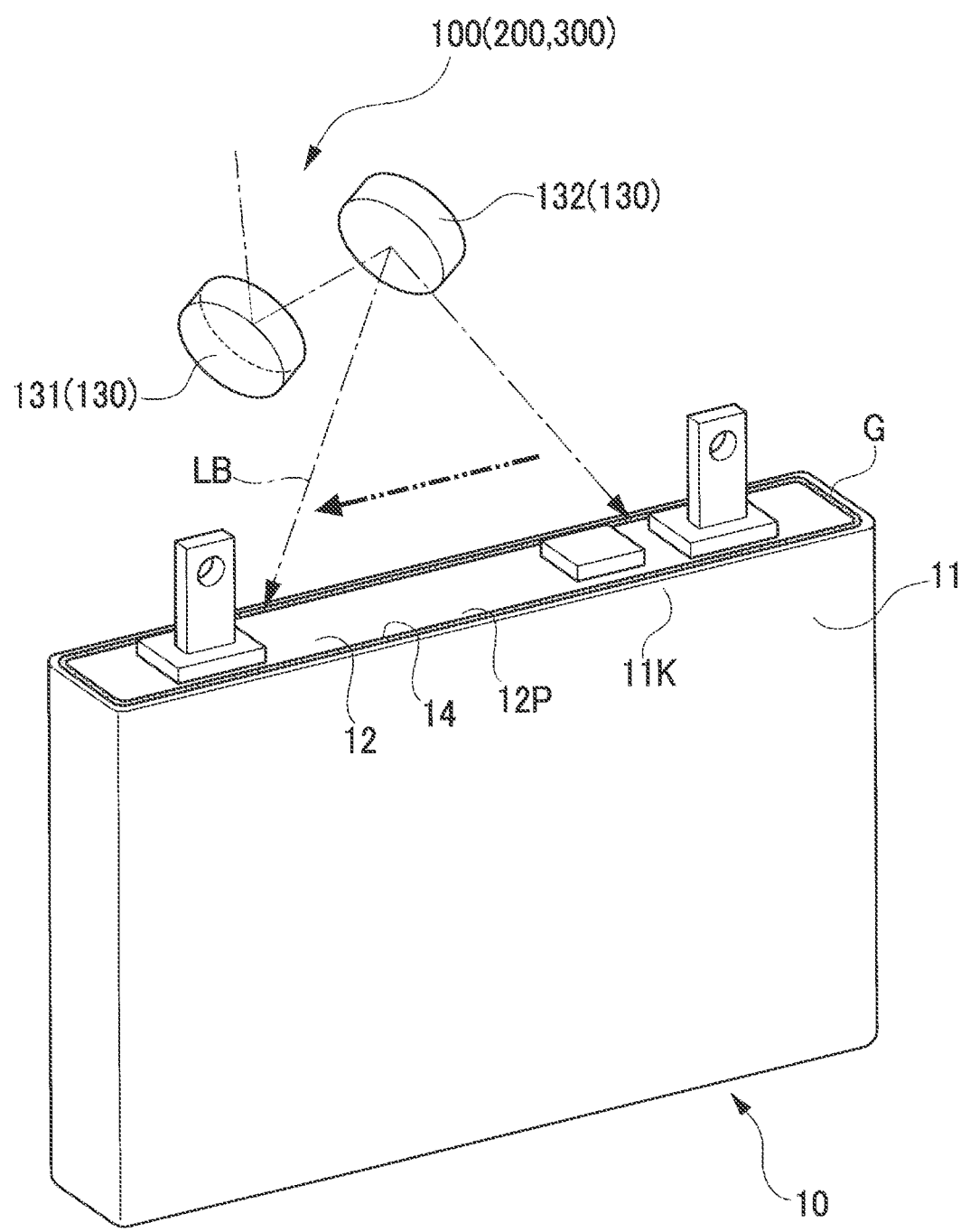
FIG. 4 is an explanatory diagram showing scanning of a laser beam by the laser welding apparatus.

Hereinafter, an embodiment of the disclosure will be described with reference to the drawings. FIG. 1 is a perspective view of a battery 10 including a case body 11 and a lid 12 that are joined together by laser welding, according to this embodiment, and FIG. 2 is a top view of the battery 10 before the welding. The external shape of the battery 10 is a flat rectangular parallelepiped shape.

The case body 11 has a bottomed hollow rectangular parallelepiped shape and is open upward in FIG. 1, and the lid 12 has a rectangular plate shape and is inserted into an opening portion 11K of the case body 11 at an upper end of the case body 11 to close the opening portion 11K. The battery 10 is formed by joining together the case body 11 and a peripheral edge portion 12P of the lid 12 by a welded portion 14 that is formed entirely around the peripheral edge portion 12P of the lid 12 by laser welding. An electrode body, an electrolyte solution, and the like, all not shown, are housed in the case body 11, and a positive electrode terminal 15 and a negative electrode terminal 16 protrude to the outside through the lid 12. An electrolyte injection hole sealing member 17 closing an electrolyte injection hole (not shown) is fixed to the lid 12 at a portion between the positive electrode terminal 15 and the negative electrode terminal 16. The battery 10 is a secondary battery, specifically a lithium-ion secondary battery, that is chargeable and dischargeable through the positive electrode terminal 15 and the negative electrode terminal 16. In this embodiment, the case body 11 and the lid 12 are both made of aluminum. In this embodiment, three directions of the battery 10 that are perpendicular to each other are defined such that, as shown in FIGS. 1 and 2, the longitudinal direction of the lid 12 is defined as an X-direction XW, the lateral direction of the lid 12 as a Y-direction YW, and the depth direction of the case body 11 as a Z-direction ZW.

A manufacturing method of the battery 10 of this embodiment includes an insertion process of inserting the lid 12 into the opening portion 11K of the case body 11 and a laser welding process of irradiating a laser beam to join together the opening portion 11K of the case body 11 and the peripheral edge portion 12P of the lid 12 by laser welding.

First, the insertion process will be described. As shown in FIGS. 1 and 2, the positive electrode terminal 15 and the negative electrode terminal 16 protrude from the inner side of the lid 12, while the positive electrode terminal 15 and the negative electrode terminal 16 hold the electrode body (not shown) in the case body 11. In the insertion process, the lid 12 is inserted into the opening portion 11K of the case body 11 so as to insert the electrode body into the case body 11. As a result, an opening inner side surface 11KS of the opening portion 11K of the case body 11 and an outer peripheral surface 12PS of the peripheral edge portion 12P of the lid 12 are disposed at positions facing each other.

The case body 11 and the lid 12 are formed such that a slight gap G is formed between the opening inner side surface 11KS and the outer peripheral surface 12PS. The reason for this is to allow the lid 12 to be smoothly inserted into the opening portion 11K of the case body 11. In this embodiment, the lid 12 is inserted into the opening portion 11K of the case body 11 so that an irradiation target surface 11KT being an end face of the opening portion 11K of the case body 11 and an irradiation target surface 12PT being an upper surface of the peripheral edge portion 12P of the lid 12 coincide in position with each other in the Z-direction ZW, i.e. the irradiation target surface 11KT and the irradiation target surface 12PT are flush with each other (see FIGS. 8 and 11).

Then, the laser welding process of joining together the opening portion 11K of the case body 11 and the peripheral edge portion 12P of the lid 12 by laser welding is performed. In this embodiment, a laser welding apparatus 100 is used for performing laser welding, and therefore, the laser welding apparatus 100 will be first described with reference to FIGS. 2 to 8. The laser welding apparatus 100 is a so-called 3D galvano scanner. Specifically, the laser welding apparatus 100 includes a light source portion 110 configured to form a parallel laser beam LP, an element portion 140 including a diffractive optical element member 141 and configured to form a multiple laser beam LB from the parallel laser beam LP that has entered the diffractive optical element member 141, a condensing portion 120 configured to condense the multiple laser beam LB, and a deflecting portion 130 configured to deflect the multiple laser beam LB.

The light source portion 110 includes a laser oscillator 111 configured to generate laser light, and a collimator (collimating lens) 115 configured to convert laser light LZ emitted from an emitting port 111S of the laser oscillator 111 into a parallel laser beam LP. In this embodiment, a fiber laser is used as the laser oscillator 111. The parallel laser beam LP passes through the diffractive optical element member 141 of the element portion 140 so as to be converted into a multiple laser beam LB composed of a plurality of laser beams LD0 to LD8, LT1, LT2, which will be described later, and then the multiple laser beam LB passes through a Z-lens 125 of the condensing portion 120. Then, the multiple laser beam LB is reflected by a first galvano scanner 131 and a second galvano scanner 132 of the deflecting portion 130 and then emitted to the outside through a condensing lens 121 and a protective lens 122. The laser beams LD0 to LD8, LT1, LT2 forming the multiple laser beam LB emitted from the laser welding apparatus 100 proceed along an optical axis LBX of the multiple laser beam LB and are respectively focused to a focal point SP.

With the laser welding apparatus 100 being the 3D galvano scanner, by moving the Z-lens 125 in an optical axis direction LBH along the optical axis LBX of the multiple laser beam LB, the position of a focal plane SPS (focal point SP) to which the multiple laser beam LB is condensed can be changed in the Z-direction ZW. The first galvano scanner 131 is configured to be able to deflect the incident multiple laser beam LB (its optical axis LBX) in the X-direction XW by changing the deflection angle of the first galvano scanner 131. Likewise, the second galvano scanner 132 is configured to be able to deflect the incident multiple laser beam LB (its optical axis LBX) in the Y-direction YW by changing the deflection angle of the second galvano scanner 132. Operations of the laser oscillator 111, the Z-lens 125, the first galvano scanner 131, the second galvano scanner 132, and a rectilinear moving portion 148 of the element portion 140, which will be described later, are controlled by a control portion 160 (see FIG. 3).

Using the laser welding apparatus 100, the multiple laser beam LB is irradiated to the opening portion 11K of the case body 11 and the peripheral edge portion 12P of the lid 12 along a boundary BD (indicated by a one-dot chain line in FIG. 2) between the case body 11 and the lid 12, thereby joining together the opening portion 11K and the peripheral edge portion 12P entirely around the peripheral edge portion 12P by laser welding. The boundary BD between the case body 11 and the lid 12 includes a first longitudinal region X1 and a second longitudinal region X2 each extending in a straight line in the X-direction XW, a first lateral region Y1 and a second lateral region Y2 each extending in a straight line in the Y-direction YW, and arc-shaped regions R1 to R4 each changing in direction by 90 degrees in an arc shape. In this embodiment, laser welding is performed by advancing the multiple laser beam LB counterclockwise from a welding start position TS in the first lateral region Y1 while causing the optical axis LBX of the multiple laser beam LB to coincide with the boundary BD (regions Y1, X1, Y2, X2, R1 to R4) (see FIG. 4). In the first longitudinal region X1, scan control is performed such that the multiple laser beam LB is advanced in an X positive direction XW1 (rightward in FIG. 2). In the second longitudinal region X2, scan control is performed such that the multiple laser beam LB is advanced in an X negative direction XW2 (leftward in FIG. 2). In the first lateral region Y1, scan control is performed such that the multiple laser beam LB is advanced in a Y negative direction YW2 (downward in FIG. 2). In the second lateral region Y2, scan control is performed such that the multiple laser beam LB is advanced in a Y positive direction YW1 (upward in FIG. 2). Also in each of the arc-shaped regions R1 to R4, scan control is performed such that the multiple laser beam LB is advanced along a corresponding one of the regions R1 to R4.

In order to perform laser welding twice in the vicinity of the welding start position TS, a welding end position TE of laser welding is determined at a position more on the Y negative direction YW2 side than the welding start position TS as shown in FIG. 2.

Figure 5:
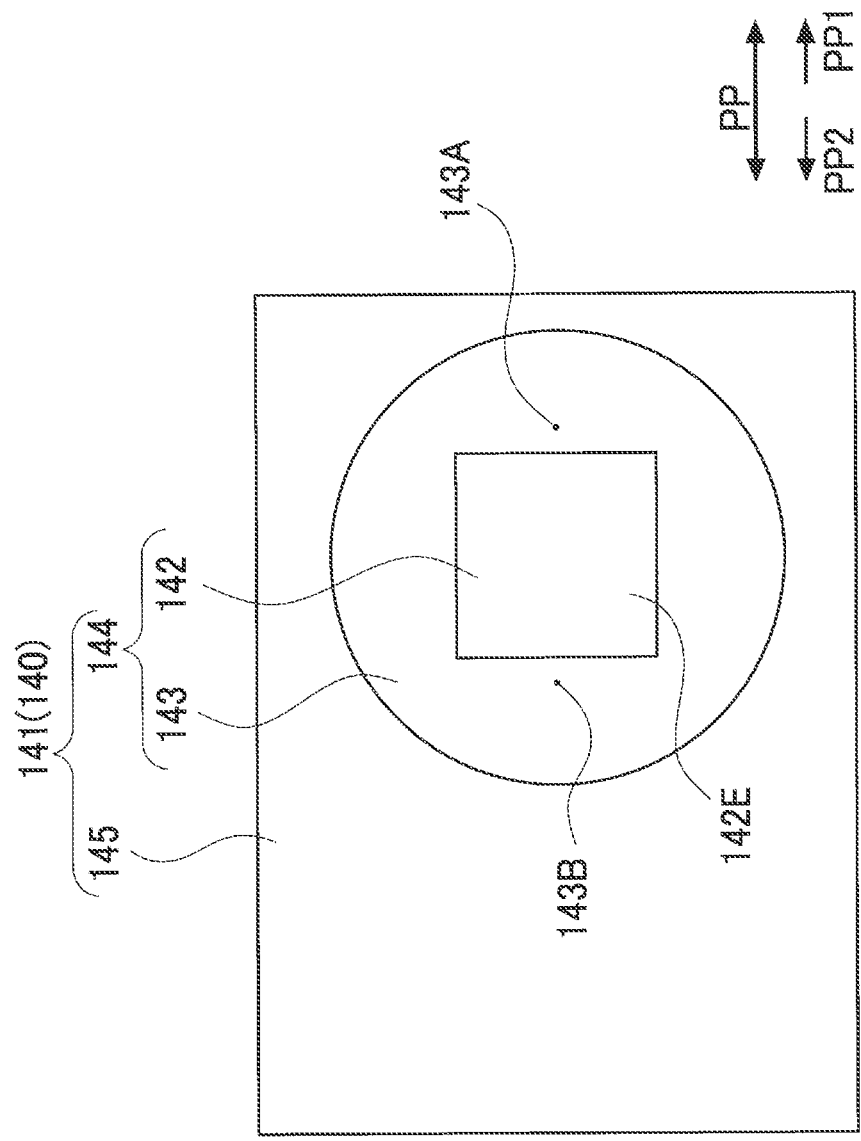
FIG. 5 is a plan view showing the configuration of a diffractive optical element member of an element portion.

Next, the element portion 140 and the multiple laser beam LB that is emitted from the element portion 140 will be described. The element portion 140 (see FIG. 5) includes the diffractive optical element member 141 and the rectilinear moving portion 148. The diffractive optical element member 141 includes a light transmitting portion 144 through which the incident parallel laser beam LP passes, and a holding portion 145 holding the light transmitting portion 144. The light transmitting portion 144 has a disc shape and is made of quartz glass. A rectangular region of the light transmitting portion 144 at its central portion is an element forming portion 142 in which a number of diffractive optical elements 142E having a predetermined diffraction pattern are formed by microfabrication. On the other hand, a region around the element forming portion 142 is not formed with a diffractive optical element and is a flat plate-shaped non-forming portion 143 that is optically transparent. In FIG. 5, in the non-forming portion 143, its region adjacent to the right side (a first side PP1 in a later-described moving direction PP) of the element forming portion 142 is a first non-forming portion 143A, and its region adjacent to the left side (a second side PP2 in the moving direction PP) of the element forming portion 142 is a second non-forming portion 143B.

Figure 6:
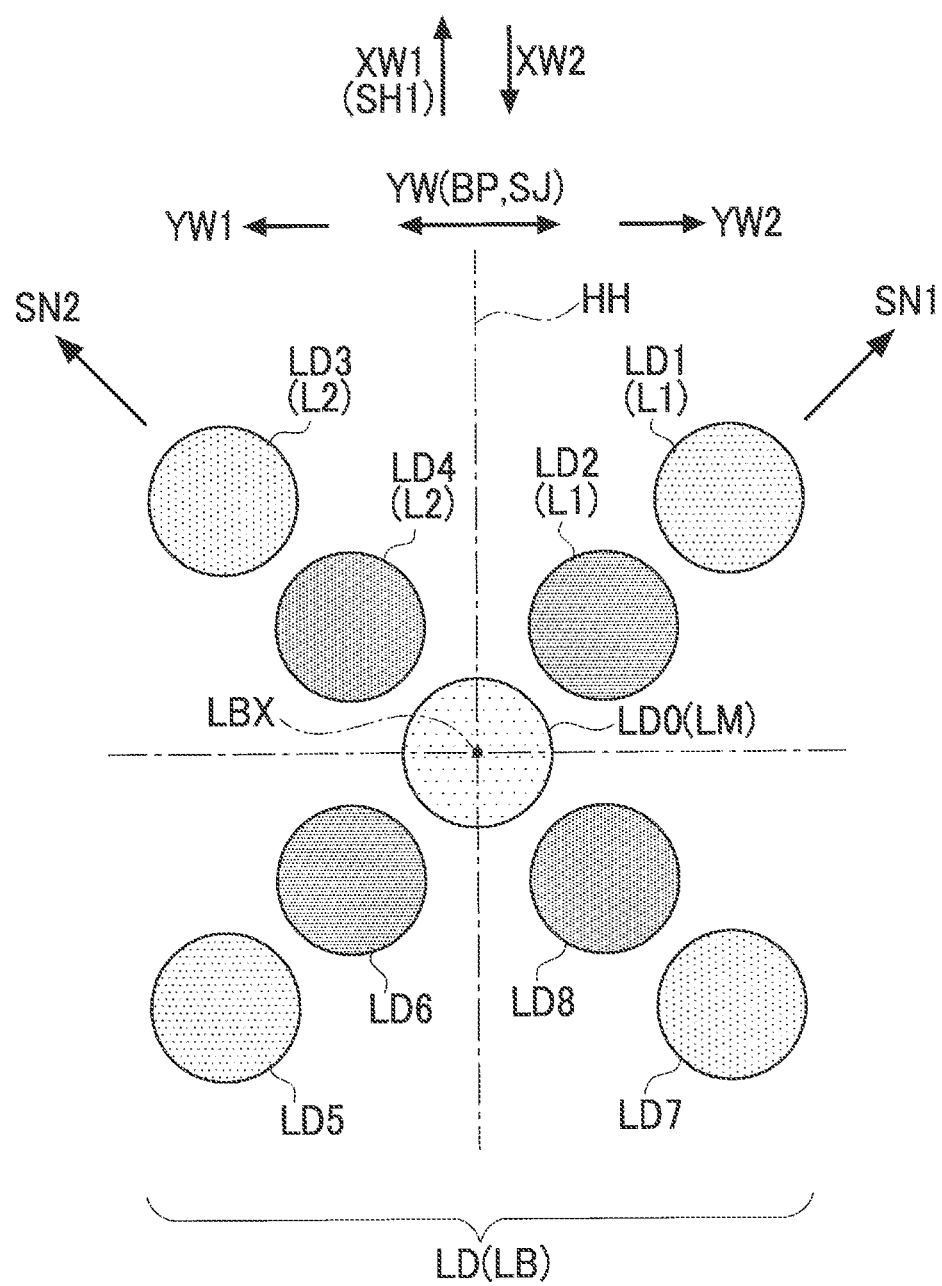
FIG. 6 is a diagram showing an irradiation pattern of a diffracted multiple beam that is emitted from an element forming portion (diffractive optical elements) of the diffractive optical element member and irradiated to a case body and a lid.

The diffractive optical elements 142E are formed in a pattern such that when the parallel laser beam LP has entered the element forming portion 142, a diffracted multiple beam LD (LD0 to LD8) composed of a plurality of laser beams arranged as shown in FIG. 6 is condensed to the focal plane SPS. In the diffracted multiple beam LD, the zero-order light beam LD0 is a laser beam that is formed by zero-order light passing through and proceeding without being diffracted by the element forming portion 142 (diffractive optical elements 142E). On the other hand, the diffracted beams LD2, LD4, LD6, and LD8 are primary light of the diffractive optical elements 142E, and the diffracted beams LD1, LD3, LD5, and LD7 are secondary light of the diffractive optical elements 142E. In this embodiment, in the diffracted multiple beam LD, the zero-order light beam LD0 has the highest energy, and the other diffracted beams LD1 to LD8 have energies that are approximately equal to each other. The beams LD0 to LD8 forming the diffracted multiple beam LD move together and synchronously by deflection using the deflecting portion 130.

When, for example, the diffracted multiple beam LD (multiple laser beam LB) is advanced by the deflecting portion 130 in the X positive direction XW1 (upward in FIG. 6) indicated by an arrow in FIG. 6 (assuming that the X positive direction XW1 is an advancing direction SH1 of the multiple laser beam LB), the zero-order light beam LD0 being a main beam LM is advanced on a virtual path HH indicated by a one-dot chain line extending vertically in FIG. 6. The diffracted beams LD1, LD2 that are irradiated on a first obliquely front side SN1 in the advancing direction SH1 of the multiple laser beam LB (upper right direction in FIG. 6) so as to be spaced apart from the main beam LM are defined as first beams L1. Likewise, the diffracted beams LD3, LD4 that are irradiated on a second obliquely front side SN2 in the advancing direction SH1 of the multiple laser beam LB (upper left direction in FIG. 6) so as to be spaced apart from the main beam LM are defined as second beams L2. In this case, an advancing perpendicular direction SJ perpendicular to the advancing direction SH1 of the multiple laser beam LB (X positive direction XW1) is the Y-direction YW being a right-left direction in FIG. 6.

On the other hand, the parallel laser beam LP that has entered the non-forming portion 143 (first non-forming portion 143A, second non-forming portion 143B) passes through the non-forming portion 143 without being diffracted. A first transmitted beam LT1 having passed through the first non-forming portion 143A and a second transmitted beam LT2 having passed through the second non-forming portion 143B are condensed by the condensing portion 120 and proceed so as to be condensed to the focal point SP of the multiple laser beam LB (see FIG. 8).

Figure 7:
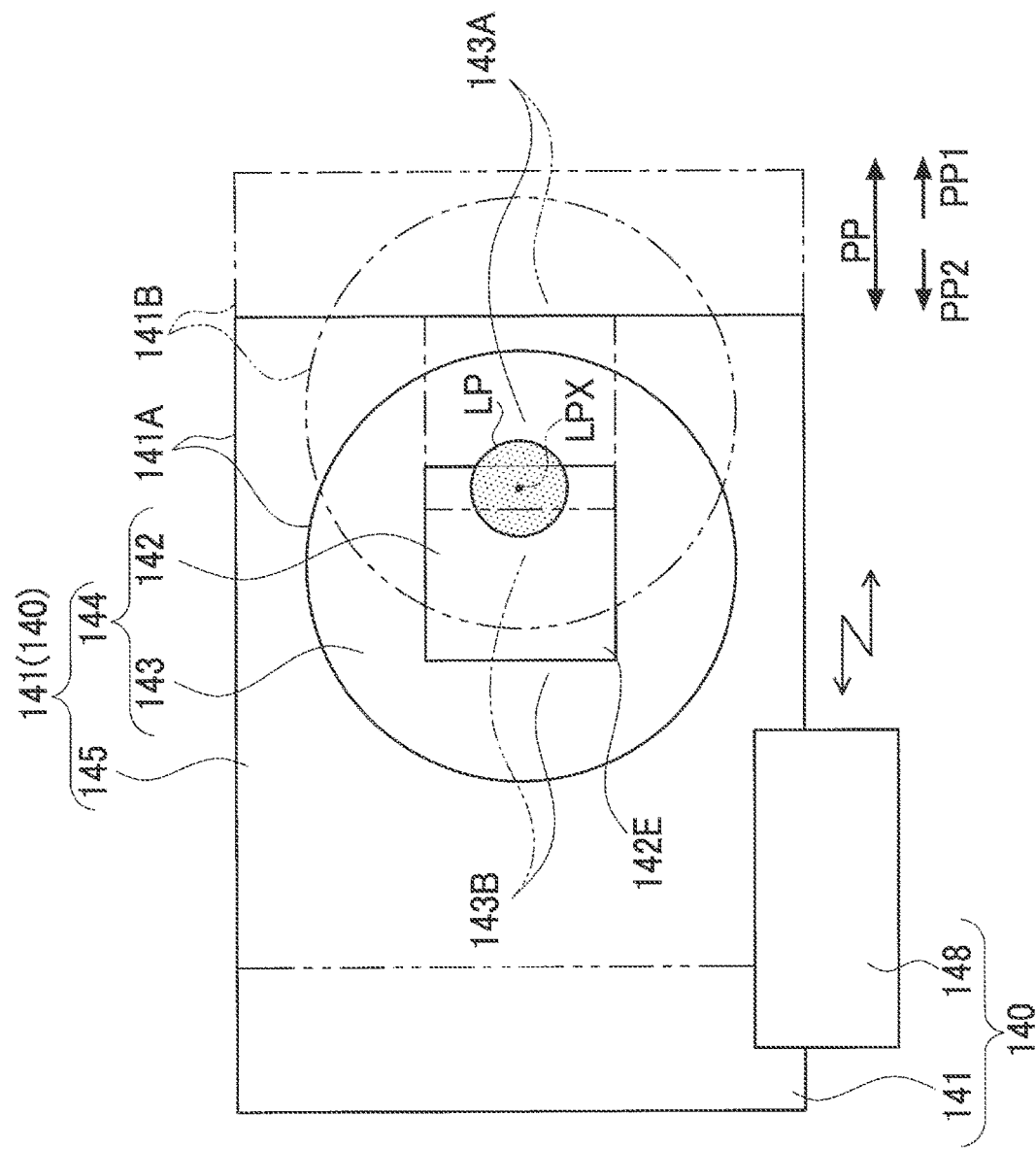
FIG. 7 is a plan view showing the configuration of the element portion including the diffractive optical element member and a rectilinear moving portion configured to linearly reciprocate the diffractive optical element member, and further showing the relationship between the element portion and a parallel laser beam.

Therefore, in this embodiment, as shown in FIG. 7, the element portion 140 includes the rectilinear moving portion 148 formed by an actuator configured to linearly reciprocate the diffractive optical element member 141 in a right-left direction in FIG. 7. Using the rectilinear moving portion 148, the diffractive optical element member 141 is linearly reciprocated between a first position 141A, indicated by a solid line in FIG. 7, where the parallel laser beam LP is irradiated to a portion overlapping the element forming portion 142 and the first non-forming portion 143A, and a second position 141B, indicated by a two-dot chain line in FIG. 7, where the parallel laser beam LP is irradiated to a portion overlapping the second non-forming portion 143B and the element forming portion 142. Consequently, when the diffractive optical element member 141 is located at the first position 141A, a first transmitted beam LT1 forming a part of a main beam LM and a diffracted multiple beam LD are emitted as a multiple laser beam LB from the diffractive optical element member 141. Likewise, when the diffractive optical element member 141 is located at the second position 141B, a diffracted multiple beam LD and a second transmitted beam LT2 forming a part of a main beam LM are emitted as a multiple laser beam LB from the diffractive optical element member 141.

Figure 8:
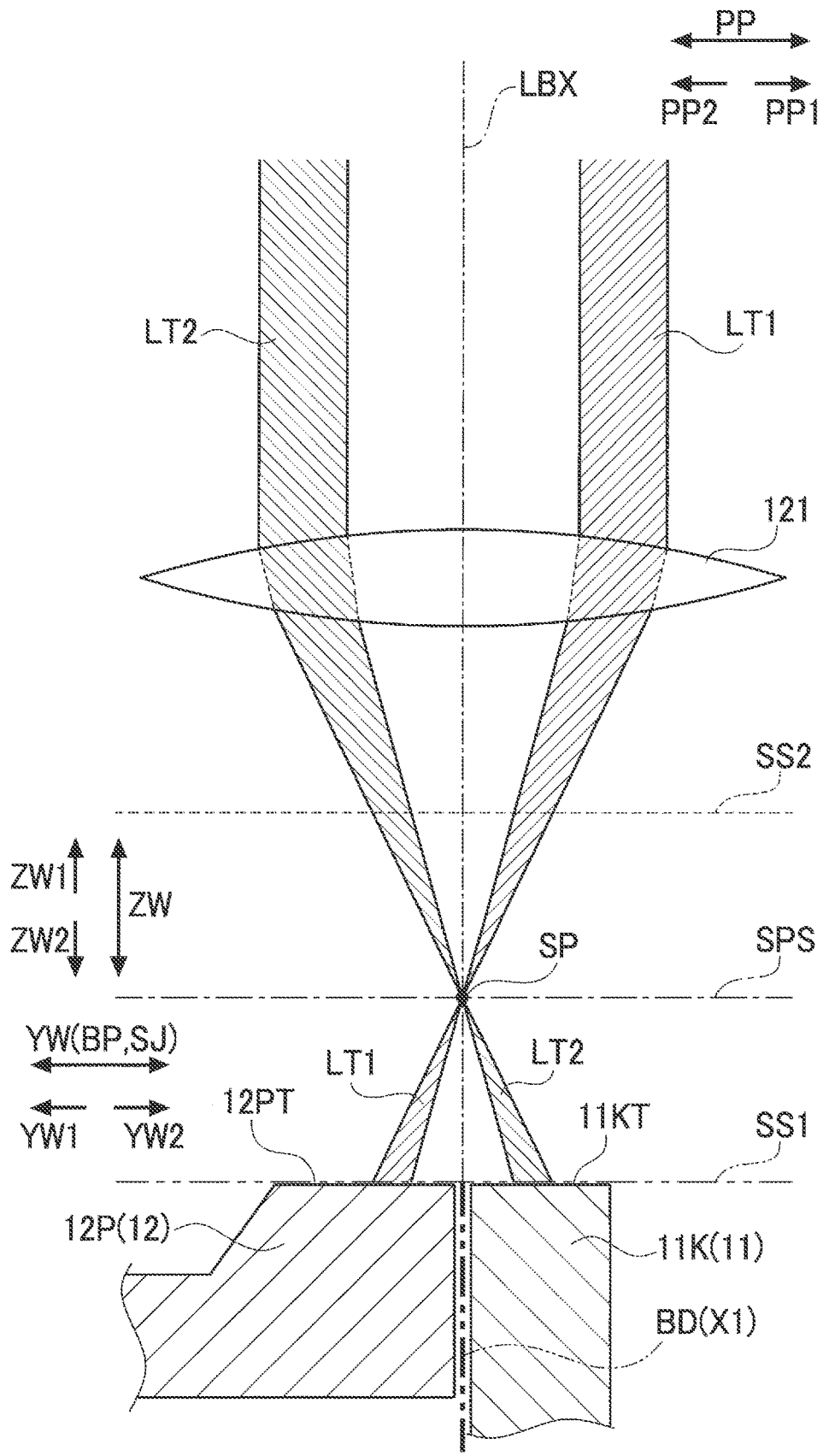
FIG. 8 is an explanatory diagram showing optical paths of a first transmitted beam and a second transmitted beam that are irradiated to the case body and the lid.
Figure 9:
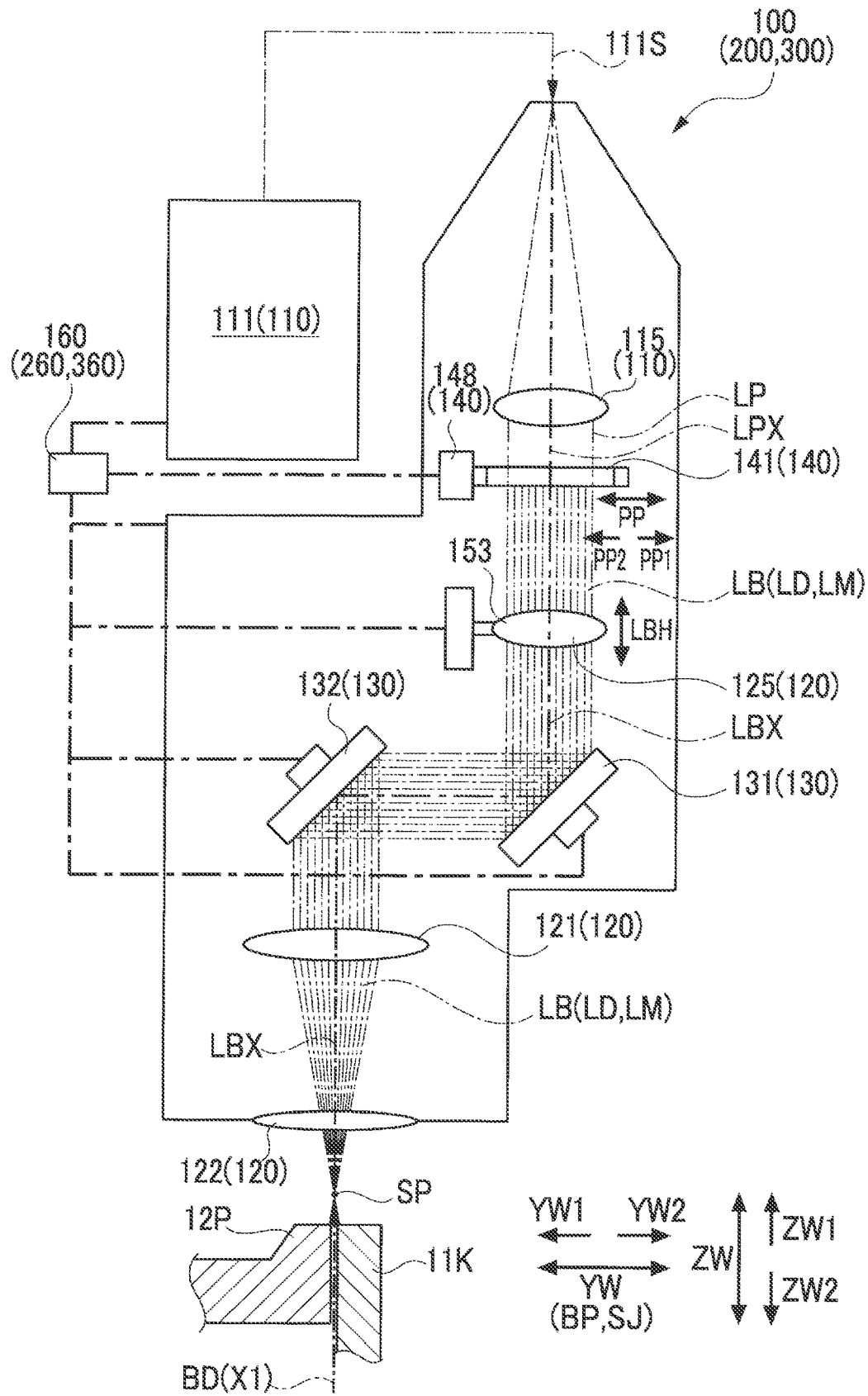
FIG. 9 is an explanatory diagram showing a state in which a multiple laser beam is condensed in a defocused state so as to be irradiated to the case body and the lid from the laser welding apparatus.

Therefore, when the diffractive optical element member 141 is located at the first position 141A or the second position 141B, the multiple laser beam LB commonly includes the diffracted multiple beam LD, but includes only one of the first transmitted beam LT1 and the second transmitted beam LT2. As shown in FIG. 8, the first transmitted beam LT1 and the second transmitted beam LT2 proceed to the condensing portion 120 from the opposite sides sandwiching the optical axis LBX of the multiple laser beam LB so as to be condensed. Therefore, the first transmitted beam LT1 and the second transmitted beam LT2 are condensed to the same focal point SP on the focal plane SPS (indicated by a one-dot chain line) to which the multiple laser beam LB is condensed.

However, when a front focus state, i.e. a first irradiation plane SS1 (indicated by a two-dot chain line) located at a position more on the Z negative direction ZW2 side in the Z-direction ZW (lower side in FIG. 8) than the focal plane SPS, is selected as an irradiation plane to which the multiple laser beam LB is irradiated, the first transmitted beam LT1 and the second transmitted beam LT2 are irradiated to the first irradiation plane SS1 at different positions in a right-left direction in FIG. 8. Likewise, when a rear focus state, i.e. a second irradiation plane SS2 (indicated by a broken line) located at a position more on the Z positive direction ZW1 side in the Z-direction ZW (upper side in FIG. 8) than the focal plane SPS, is selected as an irradiation plane to which the multiple laser beam LB is irradiated, the first transmitted beam LT1 and the second transmitted beam LT2 are irradiated to the second irradiation plane SS2 at different positions in the right-left direction in FIG. 8. However, the irradiation positions of the first transmitted beam LT1 and the second transmitted beam LT2 are reversed on the first irradiation plane SS1 and the second irradiation plane SS2.

That is, when the position of the diffractive optical element member 141 is reciprocated between the first position 141A and the second position 141B by the rectilinear moving portion 148, the first transmitted beam LT1 and the second transmitted beam LT2 appear alternately on the first irradiation plane SS1 and the second irradiation plane SS2, so that it seems as if the main beam LM composed of the transmitted beam LT and the zero-order light beam LD0 swings.

In this embodiment, the moving direction PP of the rectilinear moving portion 148 is determined such that the swing direction of the main beam LM becomes the Y-direction YW that coincides with a boundary perpendicular direction BP perpendicular to the boundary BD in the first longitudinal region X1. Consequently, in this embodiment, when the diffractive optical element member 141 is moved to the second side PP2 in the moving direction PP (left side in FIG. 7) using the rectilinear moving portion 148 so as to be located at the first position 141A as indicated by the solid line in FIG. 7, the first transmitted beam LT1 is included in the multiple laser beam LB as shown in FIG. 8. Therefore, at a position defocused from the focal point SP, for example, on the first irradiation plane SS1 indicated by the two-dot chain line, the main beam LM is irradiated at a position more on the Y positive direction YW1 side in the Y-direction YW (left side in FIG. 8) than the optical axis LBX. On the other hand, on the second irradiation plane SS2 indicated by the broken line, the main beam LM is irradiated at a position more on the Y negative direction YW2 side (right side in FIG. 8) than the optical axis LBX.

Conversely, when the diffractive optical element member 141 is moved to the first side PP1 in the moving direction PP (right side in FIG. 7) using the rectilinear moving portion 148 so as to be located at the second position 141B as indicated by the two-dot chain line in FIG. 7, the second transmitted beam LT2 is included in the multiple laser beam LB. Therefore, as shown in FIG. 8, on the first irradiation plane SS1 indicated by the two-dot chain line, the main beam LM is irradiated at a position more on the Y negative direction YW2 side than the optical axis LBX. On the other hand, on the second irradiation plane SS2 indicated by the broken line, the main beam LM is irradiated at a position more on the Y positive direction YW1 side than the optical axis LBX.

That is, with the laser welding apparatus 100, since the moving direction PP in which the rectilinear moving portion 148 moves the diffractive optical element member 141 is determined as described above, when the position of the diffractive optical element member 141 is reciprocated between the first position 141A and the second position 141B using the rectilinear moving portion 148, the first transmitted beam LT1 and the second transmitted beam LT2 appear alternately on the first irradiation plane SS1 and the second irradiation plane SS2, so that it seems as if the main beam LM including the transmitted beam LT swings in the Y-direction YW. In this embodiment, as shown in FIG. 8, the case body 11 and the lid 12 are disposed such that the irradiation target surfaces 11KT, 12PT of the opening portion 11K of the case body 11 and the peripheral edge portion 12P of the lid 12 coincide with the first irradiation plane SS1 located at the position more on the Z negative direction ZW2 side than the focal plane SPS.

Figure 13:
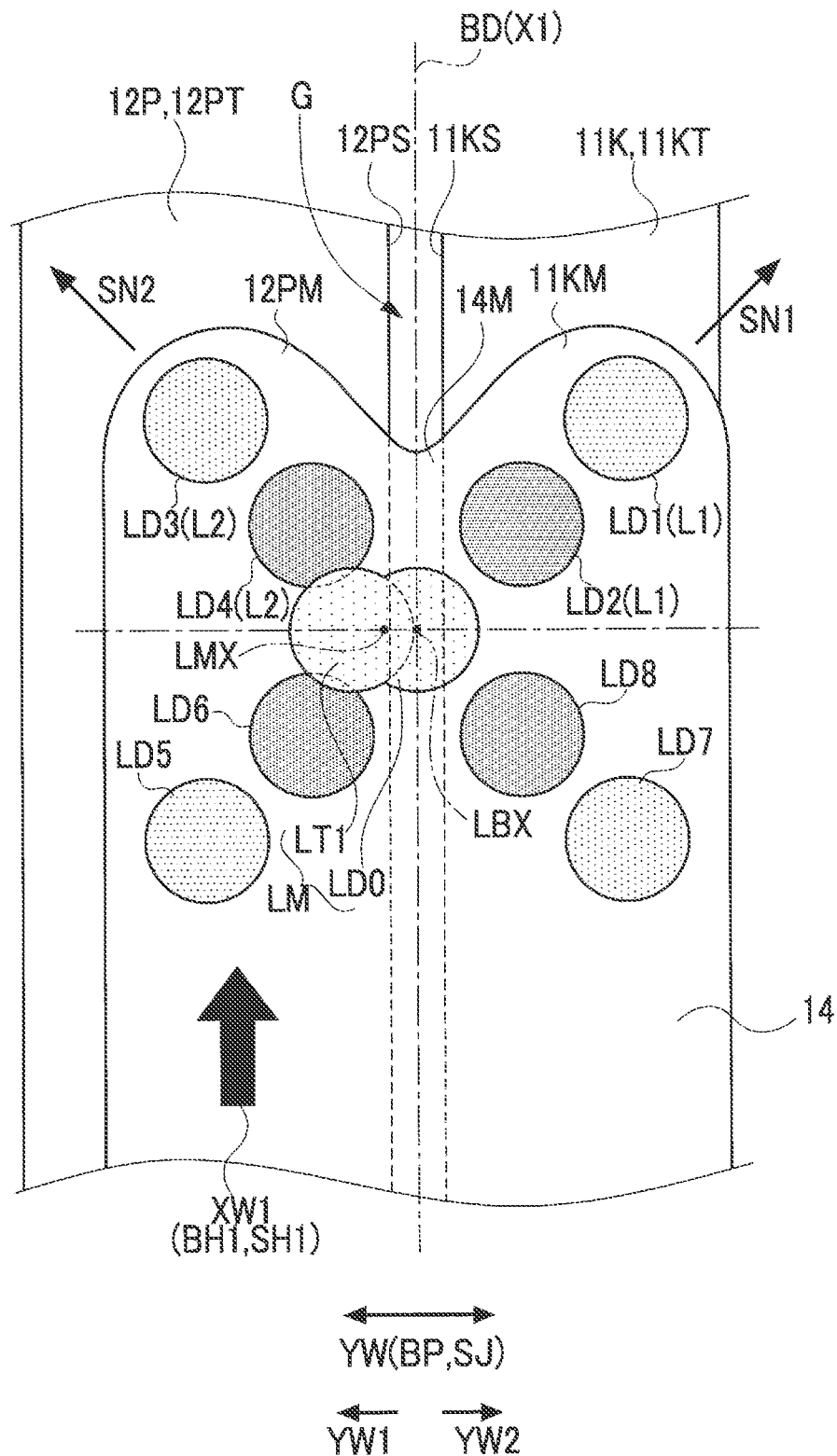
FIG. 13 is an explanatory diagram showing the relationship of a multiple laser beam with the case body and the lid, wherein the multiple laser beam is formed by superimposing a first transmitted beam on a diffracted multiple beam emitted from the element forming portion (diffractive optical elements) of the diffractive optical element member.
Figure 14:
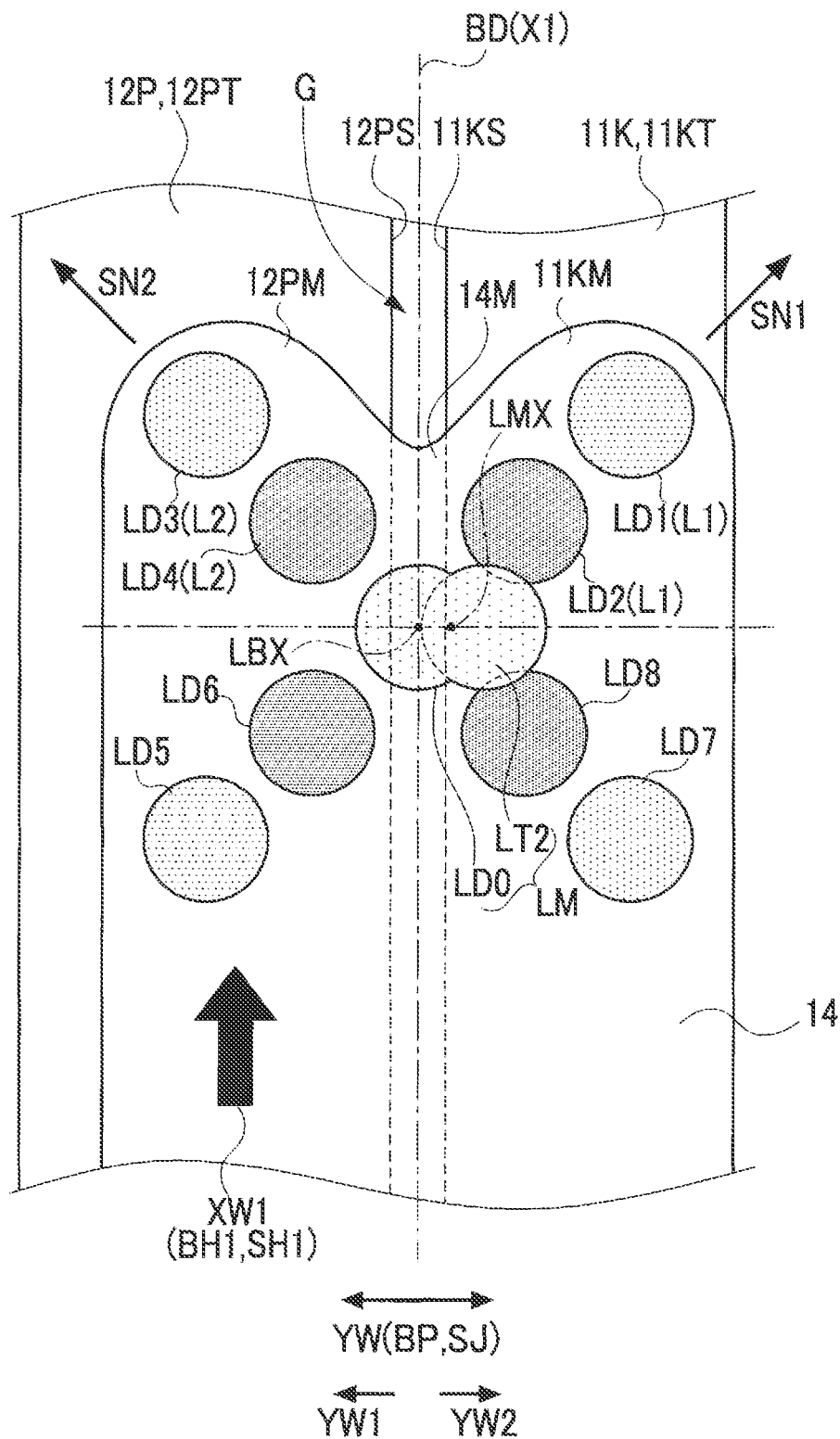
FIG. 14 is an explanatory diagram showing the relationship of a multiple laser beam with the case body and the lid, wherein the multiple laser beam is formed by superimposing a second transmitted beam on a diffracted multiple beam emitted from the element forming portion (diffractive optical elements) of the diffractive optical element member.

Next, laser welding of the opening portion 11K of the case body 11 and the peripheral edge portion 12P of the lid 12 in the first longitudinal region X1 using the laser welding apparatus 100 will be described (see FIG. 2). In the first longitudinal region X1, the multiple laser beam LB that is emitted from the laser welding apparatus 100 is advanced in an advancing direction BH1 along the boundary BD, i.e. the X positive direction XW1, while causing the optical axis LBX of the multiple laser beam LB to coincide with the boundary BD. Consequently, as shown in FIGS. 10, 13, and 14, the multiple laser beam LB is irradiated to the irradiation target surface 11KT of the opening portion 11K of the case body 11 and the irradiation target surface 12PT of the peripheral edge portion 12P of the lid 12.

Figure 10:
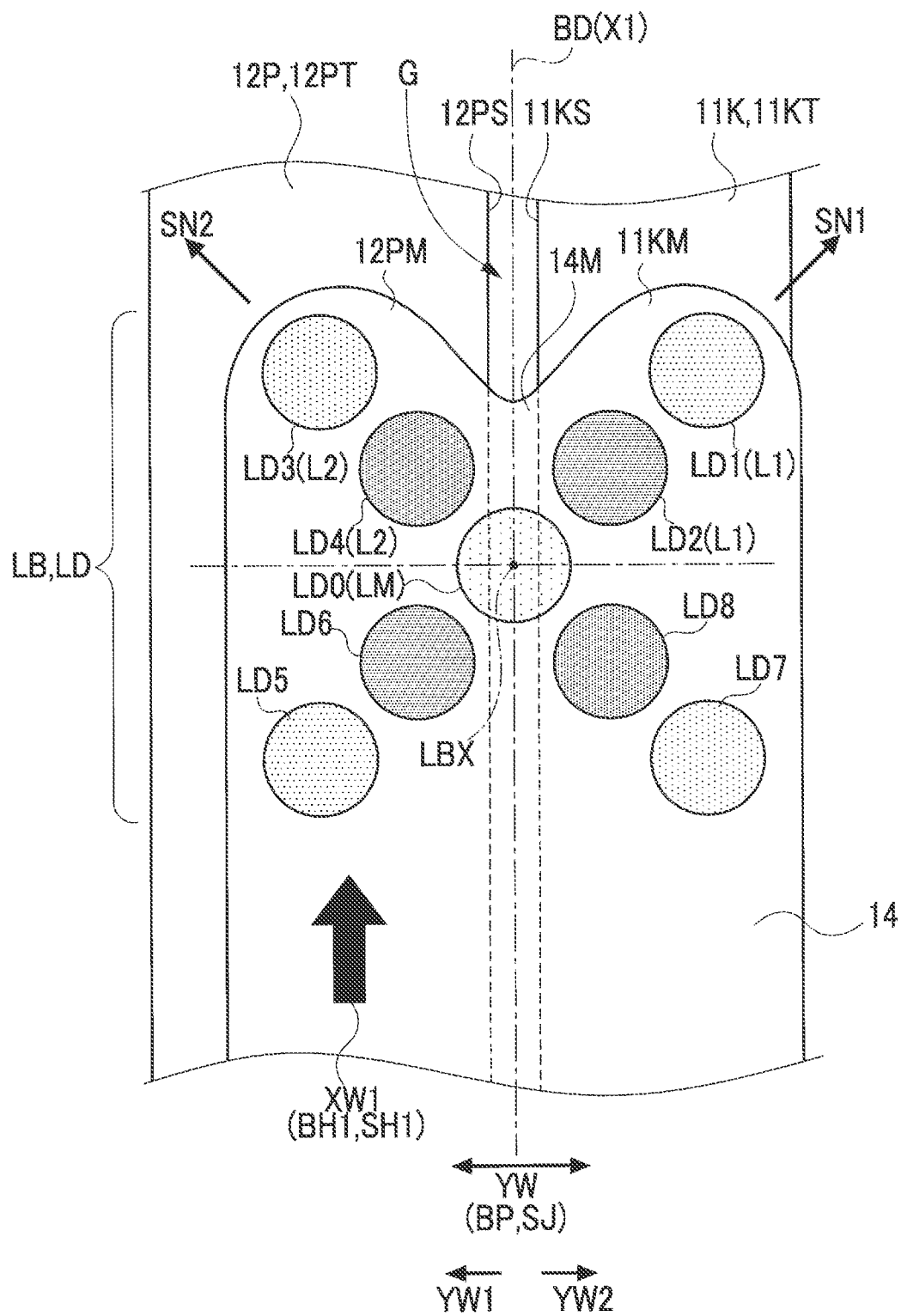
FIG. 10 is an explanatory diagram showing the relationship of a multiple laser beam with the case body and the lid, wherein the multiple laser beam includes only a diffracted multiple beam emitted from the element forming portion (diffractive optical elements) of the diffractive optical element member and does not include either a first transmitted beam or a second transmitted beam.

FIG. 10 shows a state in which the multiple laser beam LB including only the diffracted multiple beam LD, but not including either the first transmitted beam LT1 or the second transmitted beam LT2 is irradiated to the irradiation target surface 11KT of the case body 11 and the irradiation target surface 12PT of the lid 12. This case corresponds to a case where the diffractive optical element member 141 is located at an intermediate position between the first position 141A and the second position 141B, and the parallel laser beam LP in its entirety is located in the element forming portion 142 formed with the diffractive optical elements 142E (see FIG. 7).

When the diffracted multiple beam LD is irradiated to the irradiation target surface 11KT and the irradiation target surface 12PT, the opening portion 11K of the case body 11 is melted by the first beams L1 (diffracted beams LD1, LD2), included in the diffracted multiple beam LD, that are irradiated on the first obliquely front side SN1 in the advancing direction SH1 of the diffracted multiple beam LD (upper right direction in FIG. 10) so as to be spaced apart from the main beam LM (zero-order light beam LD0), so that a first molten pool 11KM is formed. Likewise, the peripheral edge portion 12P of the lid 12 is melted by the second beams L2 (diffracted beams LD3, LD4), included in the diffracted multiple beam LD, that are irradiated on the second obliquely front side SN2 in the advancing direction SH1 of the diffracted multiple beam LD (upper left direction in FIG. 10) so as to be spaced apart from the main beam LM (zero-order light beam LD0), so that a second molten pool 12PM is formed.

Figure 11:
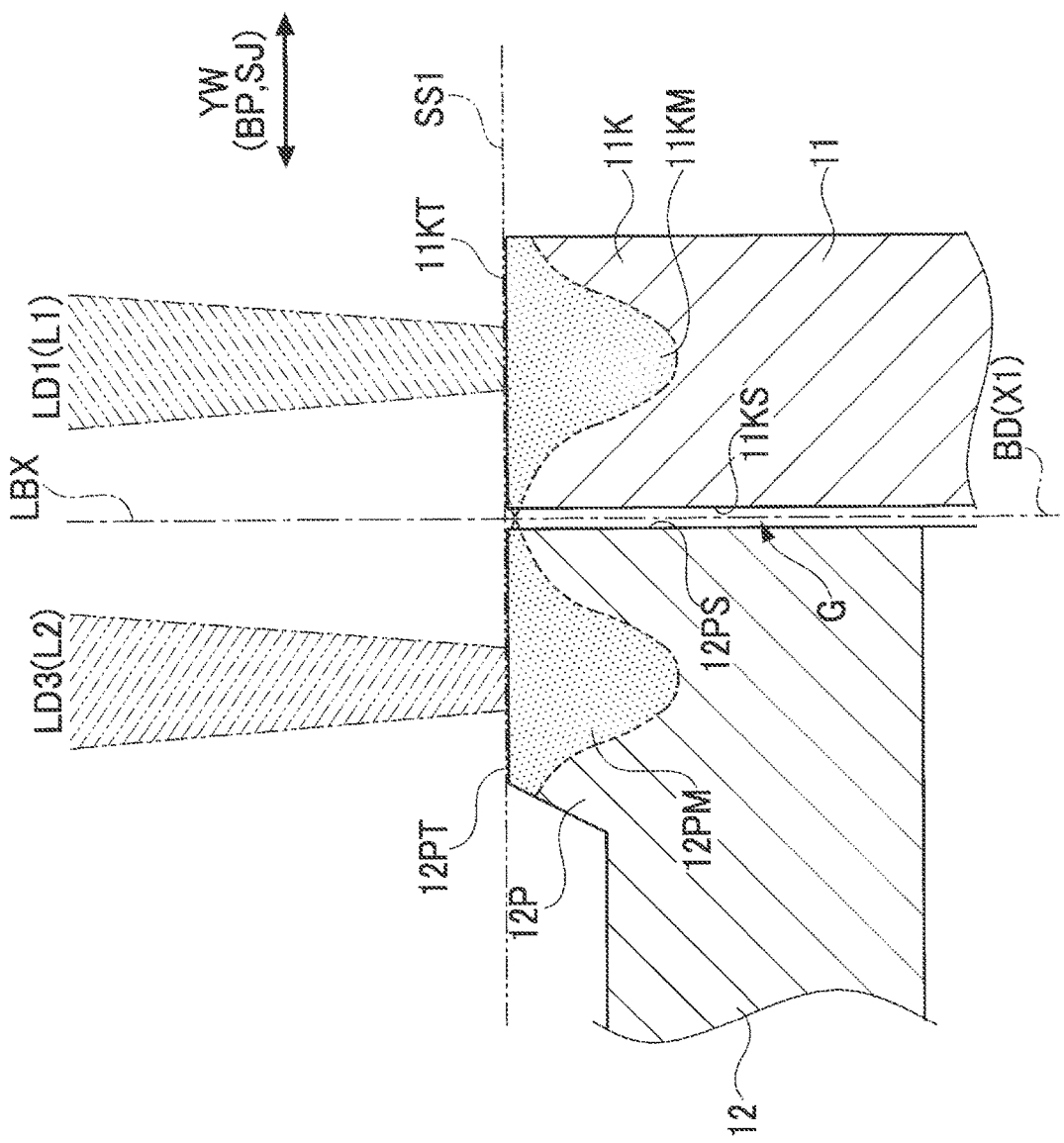
FIG. 11 is an explanatory diagram showing the relationship between a first beam and a second beam of the diffracted multiple beam and melted portions of the case body and the lid.
Figure 12:
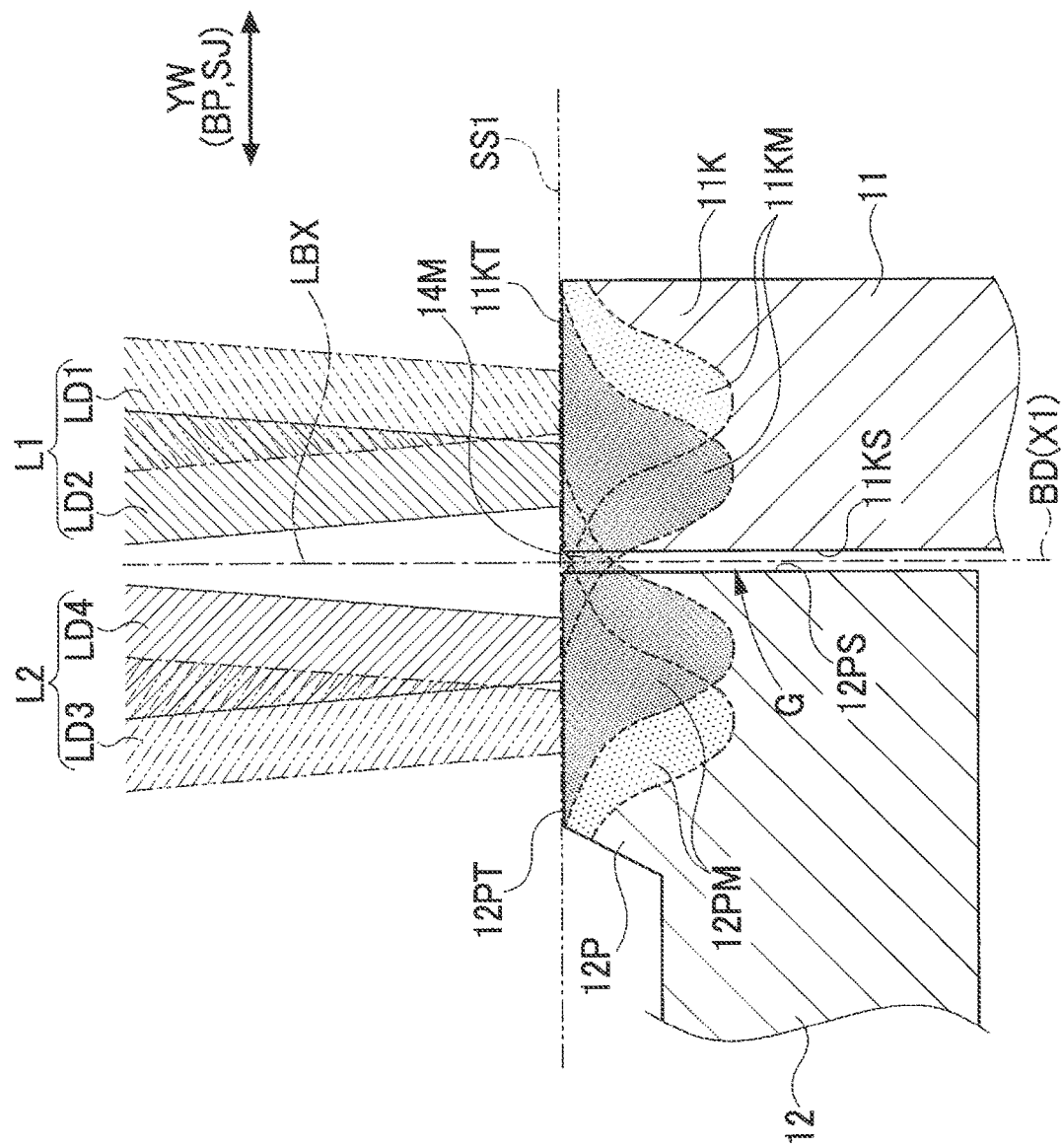
FIG. 12 is an explanatory diagram showing the relationship between first beams and second beams of the diffracted multiple beam and melted portions of the case body and the lid.

As shown in FIG. 11, the outer diffracted beams LD1, LD3 of the first beams L1 and the second beams L2 are irradiated to portions, somewhat spaced apart from the boundary BD, of the opening portion 11K of the case body 11 and the peripheral edge portion 12P of the lid 12, thereby respectively forming the first molten pool 11KM and the second molten pool 12PM. Further, as shown in FIG. 12, the inner diffracted beams LD2, LD4 of the first beams L1 and the second beams L2 are irradiated to portions, closer to the boundary BD than the diffracted beams LD1, LD3, of the opening portion 11K of the case body 11 and the peripheral edge portion 12P of the lid 12, thereby respectively expanding the first molten pool 11KM and the second molten pool 12PM to the boundary BD sides. Therefore, the first molten pool 11KM and the second molten pool 12PM are integrated together at the boundary BD so as to fill the gap G between the opening inner side surface 11KS and the outer peripheral surface 12PS, thereby forming an integrated molten pool 14M.

Thereafter, as shown in FIG. 10, subsequent to the first beams L1 and the second beams L2, the main beam LM (zero-order light beam LD0) is irradiated to a portion where the integrated molten pool 14M is formed, and thus, portions, close to the boundary BD, of the opening portion 11K of the case body 11 and the peripheral edge portion 12P of the lid 12 are melted deeply (to a greater dimension in the Z negative direction ZW2), so that the opening portion 11K of the case body 11 and the peripheral edge portion 12P of the lid 12 are welded together firmly. In this regard, since the main beam LM (zero-order light beam LD0) is irradiated to the portion where the integrated molten pool 14M is formed, laser-passing of the main beam LM (zero-order light beam LD0) does not occur so that the main beam LM (zero-order light beam LD0) is prevented from passing through the gap G and entering the case body 11.

Thereafter, the opening portion 11K of the case body 11 and the peripheral edge portion 12P of the lid 12 are melted further deeply by the other diffracted beams LD5 to LD8 so as to be welded together firmly.

In addition, in this embodiment, as described above, the diffractive optical element member 141 is linearly reciprocated between the first position 141A and the second position 141B by driving the rectilinear moving portion 148 of the element portion 140 (see FIG. 7). Therefore, in the state where the diffractive optical element member 141 is located at the first position 141A, the multiple laser beam LB including the first transmitted beam LT1 and the diffracted multiple beam LD is irradiated to the irradiation target surface 11KT of the case body 11 and the irradiation target surface 12PT of the lid 12. Then, as shown in FIG. 13, a main beam LM in which the first transmitted beam LT1 is added to the zero-order light beam LD0 is formed in addition to the diffracted beams LD1 to LD8. As described above, on the first irradiation plane SS1 (the irradiation target surface 11KT of the case body 11 and the irradiation target surface 12PT of the lid 12), the first transmitted beam LT1 is irradiated so as to be offset in the Y positive direction YW1 (leftward in FIG. 13) relative to the optical axis LBX of the multiple laser beam LB. Therefore, an optical axis LMX of the main beam LM composed of the zero-order light beam LD0 and the first transmitted beam LT1 is also offset in the Y positive direction YW1 relative to the optical axis LBX.

Conversely, in the state where the diffractive optical element member 141 is located at the second position 141B, the multiple laser beam LB including the second transmitted beam LT2 and the diffracted multiple beam LD is irradiated to the irradiation target surface 11KT of the case body 11 and the irradiation target surface 12PT of the lid 12. Then, as shown in FIG. 14, a main beam LM in which the second transmitted beam LT2 is added to the zero-order light beam LD0 is formed in addition to the diffracted beams LD1 to LD8. As described above, on the first irradiation plane SS1, the second transmitted beam LT2 is irradiated so as to be offset in the Y negative direction YW2 (rightward in FIG. 14) relative to the optical axis LBX of the multiple laser beam LB. Therefore, an optical axis LMX of the main beam LM composed of the zero-order light beam LD0 and the second transmitted beam LT2 is also offset in the Y negative direction YW2 relative to the optical axis LBX.

In this way, when the diffractive optical element member 141 is linearly reciprocated between the first position 141A and the second position 141B by driving the rectilinear moving portion 148, the main beam LM swings in the Y-direction YW across the boundary BD in order of FIG. 13, FIG. 10, FIG. 14, and FIG. 10. By this swing, the integrated molten pool 14M is stirred. When swinging the main beam LM, it is preferable to reciprocate the main beam LM at a frequency of three or more reciprocations per mm while the multiple laser beam LB is advanced in the advancing direction BH1 along the boundary BD (the X positive direction XW1 in the first longitudinal region X1). In this embodiment, specifically, the main beam LM is reciprocated at a frequency of six reciprocations per mm.

Figure 15:
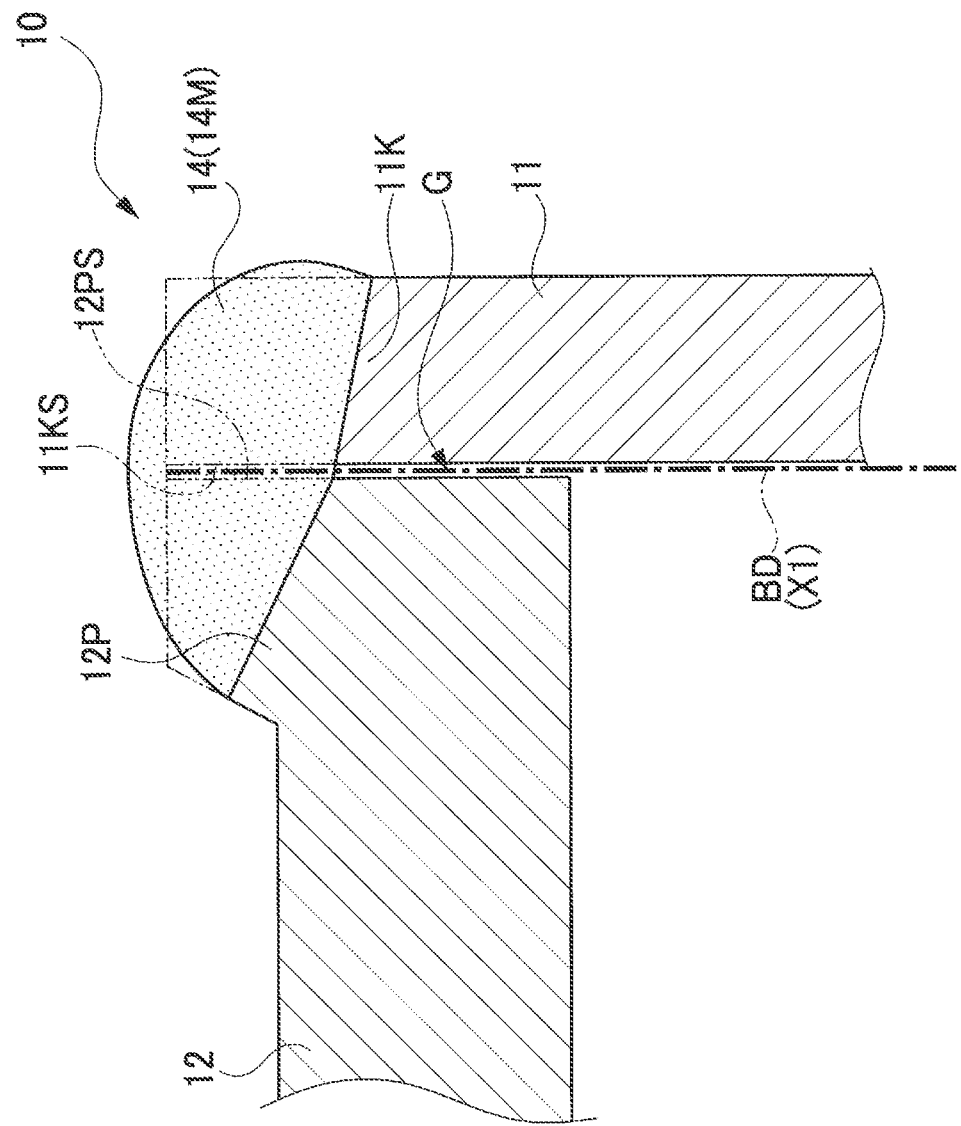
FIG. 15 is an enlarged sectional view of a welded portion between the case body and the lid joined together by laser welding, according to an embodiment.
Figure 21:
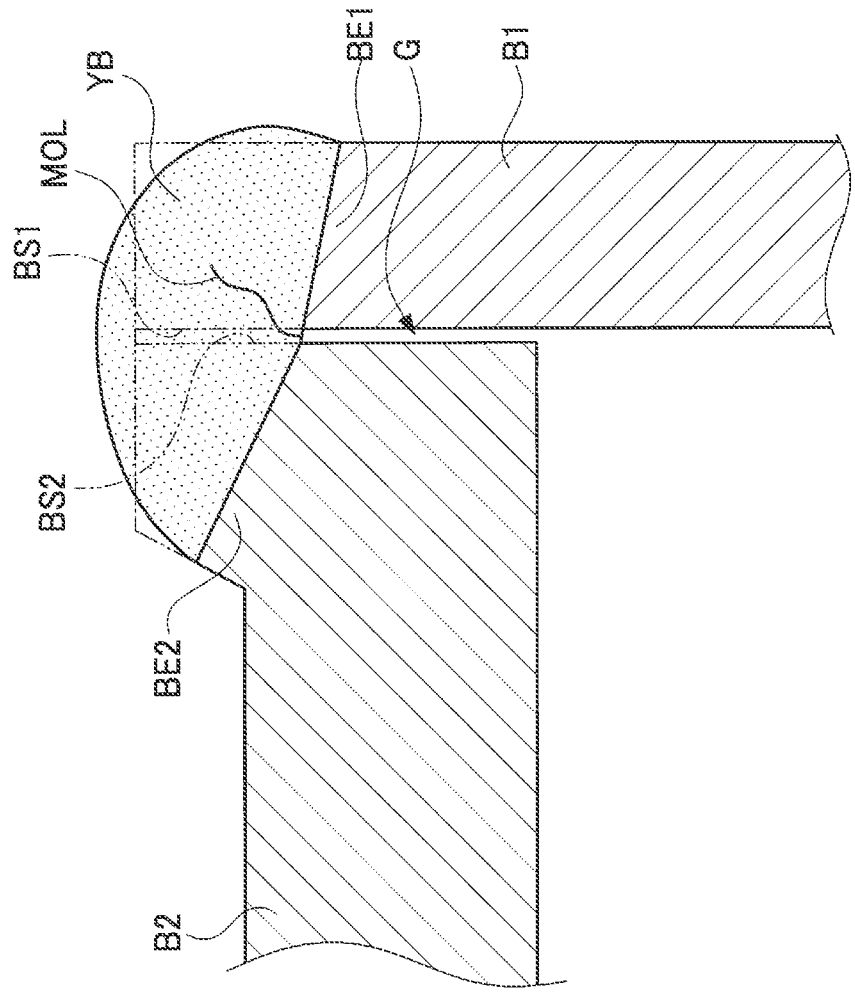
FIG. 21 is an enlarged sectional view of a welded portion between a case body and a lid joined together by laser welding, according to a reference embodiment.

As shown in broken lines in FIG. 15, the opening portion 11K of the case body 11 has the opening inner side surface 11KS along the boundary BD, and the peripheral edge portion 12P of the lid 12 has the outer peripheral surface 12PS along the boundary BD. The opening inner side surface 11KS and the outer peripheral surface 12PS are each covered with an oxide film (aluminum oxide ($Al_2O_3$)) formed by oxidation of a ground metal (aluminum). An oxide such as aluminum oxide has a high melting point and thus is relatively difficult to melt during laser welding, and therefore, depending on a laser welding state, the oxide films (aluminum oxide films) forming the opening inner side surface 11KS and the outer peripheral surface 12PS may remain as a film-like oxide layer MOL in a welded portion (see FIG. 21).

However, in this embodiment, as described above, since the multiple laser beam LB is advanced in the X positive direction XW1 while swinging the main beam LM, the integrated molten pool 14M is stirred by the main beam LM, and therefore, as shown in FIG. 15, no film-like oxide layer MOL remains in a welded portion 14. In this way, with the welding method of this embodiment, a film-like oxide layer MOL (see FIG. 21) is unlikely to be formed in the solidified welded portion 14, so that highly reliable laser welding is made possible. Particularly, in this embodiment, as described above, the multiple laser beam LB is advanced in the X positive direction XW1 while swinging the main beam LM across the boundary BD in the Y-direction YW (advancing perpendicular direction SJ) being the boundary perpendicular direction BP. Therefore, since the integrated molten pool 14M is stirred so as to cut the oxide films formed on the opening inner side surface 11KS of the opening portion 11K and the outer peripheral surface 12PS of the peripheral edge portion 12P of the lid 12, a film-like oxide layer MOL is unlikely to remain in the welded portion 14. Accordingly, since the film-like oxide layer MOL is unlikely to remain, highly reliable laser welding is made possible. On the other hand, since the diffracted beams LD1 to LD8 such as the first beams L1 and the second beams L2 do not swing, it is possible to suppress the occurrence of laser-passing such that the first beam L1 or the second beam L2 is offset from the opening portion (first boundary portion) 11K of the case body 11 and the peripheral edge portion (second boundary portion) 12P of the lid 12 so as to be irradiated to the gap G at the boundary BD.

Figure 16:
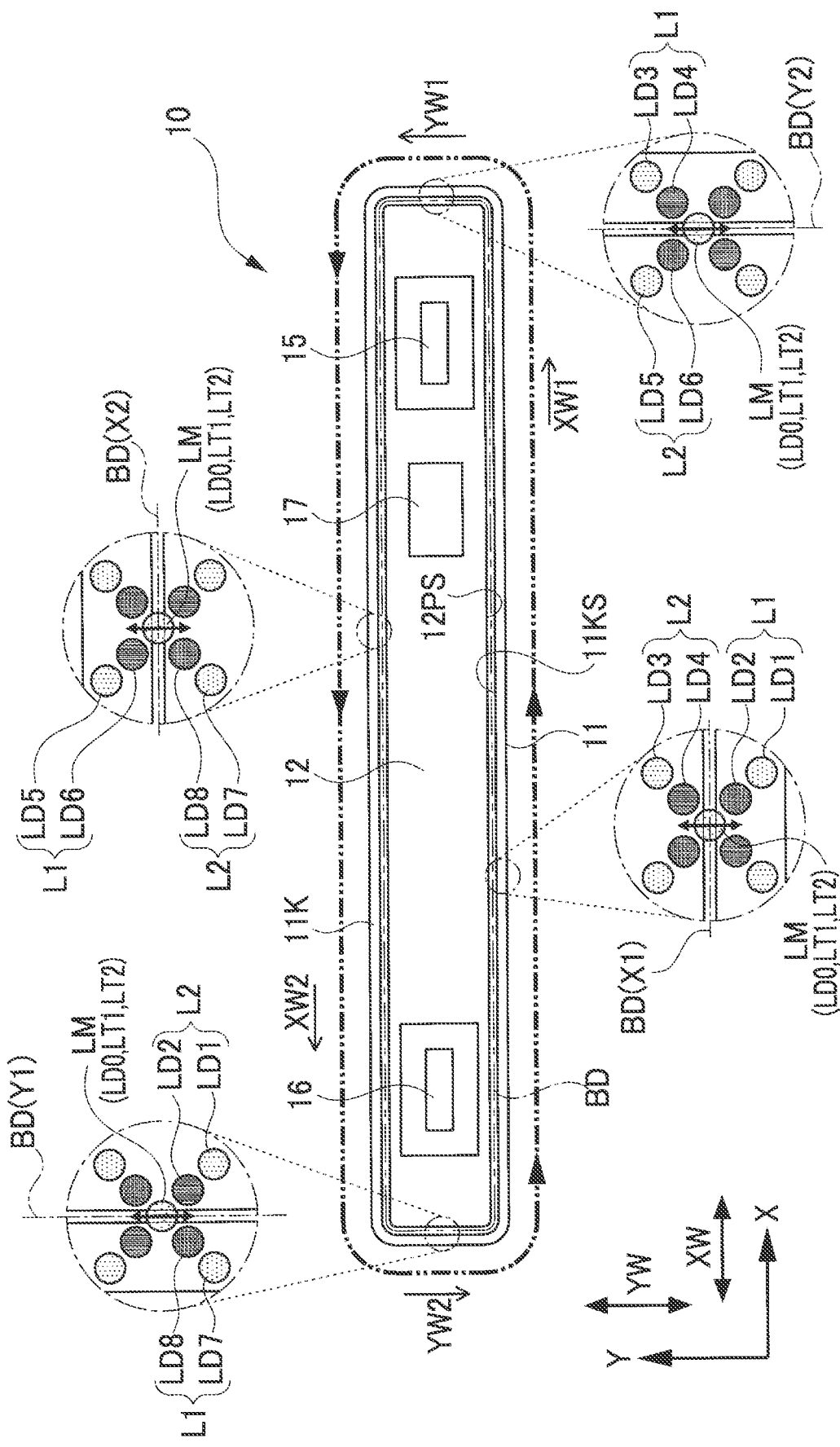
FIG. 16 is an explanatory diagram showing a state in which laser welding of the case body and the lid is performed entirely around the lid.

The description has been given that, as shown in FIGS. 2 and 16, when laser welding is performed in the first longitudinal region X1 of the boundary BD using the multiple laser beam LB, the laser welding is performed while swinging the main beam LM in the Y-direction YW. In addition, in this embodiment, also when laser welding is performed in the second longitudinal region X2 using the multiple laser beam LB, the laser welding is performed while swinging the main beam LM in the Y-direction YW using the rectilinear moving portion 148. However, in this case, since the advancing direction of the multiple laser beam LB is the X negative direction XW2, the diffracted beams LD5, LD6 of the diffracted beams LD1 to LD8 function as first beams L1, and the diffracted beams LD7, LD8 of the diffracted beams LD1 to LD8 function as second beams L2. Also in this case, a film-like oxide layer MOL (see FIG. 21) is unlikely to be formed in a solidified welded portion 14, so that highly reliable laser welding is made possible. Likewise as above, it is possible to suppress the occurrence of laser-passing of the first beam L1 or the second beam L2.

In addition, in this embodiment, also when laser welding is performed in the first lateral region Y1 or the second lateral region Y2 using the multiple laser beam LB, the laser welding is performed while swinging the main beam LM on the boundary BD in the Y-direction YW within a range of an integrated molten pool 14M by driving the rectilinear moving portion 148 (see FIG. 16). That is, while swinging the main beam LM in the Y-direction YW (advancing perpendicular direction SJ) being the advancing direction BH1 along the boundary BD, the multiple laser beam LB is advanced in the Y positive direction YW1 or the Y negative direction YW2. Also in this case, since the integrated molten pool 14M is stirred, a film-like oxide layer MOL is unlikely to remain in a welded portion 14 as shown in FIG. 15 like in the case of the longitudinal regions X1, X2. Likewise as above, it is possible to suppress the occurrence of laser-passing of the first beam L1 or the second beam L2. In addition, as described above, since the magnitude of the swing of the main beam LM in the Y-direction YW on the boundary BD is set within the range of the integrated molten pool 14M, it is also possible to suppress the occurrence of laser-passing of the main beam LM.

When the laser welding is performed in the first lateral region Y1 using the multiple laser beam LB, the advancing direction of the multiple laser beam LB is the Y negative direction YW2, so that the diffracted beams LD7, LD8 of the diffracted beams LD1 to LD8 function as first beams L1, while the diffracted beams LD1, LD2 of the diffracted beams LD1 to LD8 function as second beams L2. When the laser welding is performed in the second lateral region Y2 using the multiple laser beam LB, the advancing direction of the multiple laser beam LB is the Y positive direction YW1, so that the diffracted beams LD3, LD4 of the diffracted beams LD1 to LD8 function as first beams L1, while the diffracted beams LD5, LD6 of the diffracted beams LD1 to LD8 function as second beams L2.

On the other hand, when laser welding is performed in the arc-shaped regions R1 to R4 using the multiple laser beam LB, the laser welding is performed by forming the multiple laser beam LB by only the diffracted multiple beam LD (LD0 to LD8) without driving the rectilinear moving portion 148 (see FIG. 10).

In the laser welding method of this embodiment, since the laser welding is performed by producing the multiple laser beam LB, including the main beam LM that swings, from the parallel laser beam LP by the laser welding apparatus 100, it is not necessary to produce a multiple laser beam using a number of laser light sources, so that the optical configuration can be made simple. That is, in the laser welding apparatus 100, the multiple laser beam LB including the main beam LM that swings is produced from the parallel laser beam LP, so that the optical configuration becomes simple.

Particularly, in this embodiment, the diffracted multiple beam LD from the element forming portion 142 includes the zero-order light beam LD0 forming a part of the main beam LM. That is, since the main beam LM includes the zero-order light beam LD0, the opening portion 11K of the case body 11 and the peripheral edge portion 12P of the lid 12 can be melted deeply (largely in the optical axis direction LBH of the multiple laser beam LB) at the boundary BD, so that the opening portion 11K of the case body 11 and the peripheral edge portion 12P of the lid 12 can be welded together with high strength.

First Modified Embodiment

In the above-described embodiment, using the laser welding apparatus 100 including the rectilinear moving portion 148 configured to linearly reciprocate the diffractive optical element member 141 of the element portion 140 between the first position 141A and the second position 141B, the laser welding of the opening portion 11K of the case body 11 and the peripheral edge portion 12P of the lid 12 is performed by swinging the main beam LM in the Y-direction YW when the laser welding is performed in the longitudinal regions X1, X2 and the lateral regions Y1, Y2. The first modified embodiment differs from the above-described embodiment in that use is made of a laser welding apparatus 200 including an element portion 240 that differs from the element portion 140 of the laser welding apparatus 100. The other portions are the same as the above-described embodiment. The same portions exhibit the same operations and effects as those of the above-described embodiment. Therefore, hereinafter, different portions will be mainly described, while description of the same portions will be omitted or simplified.

Figure 17:
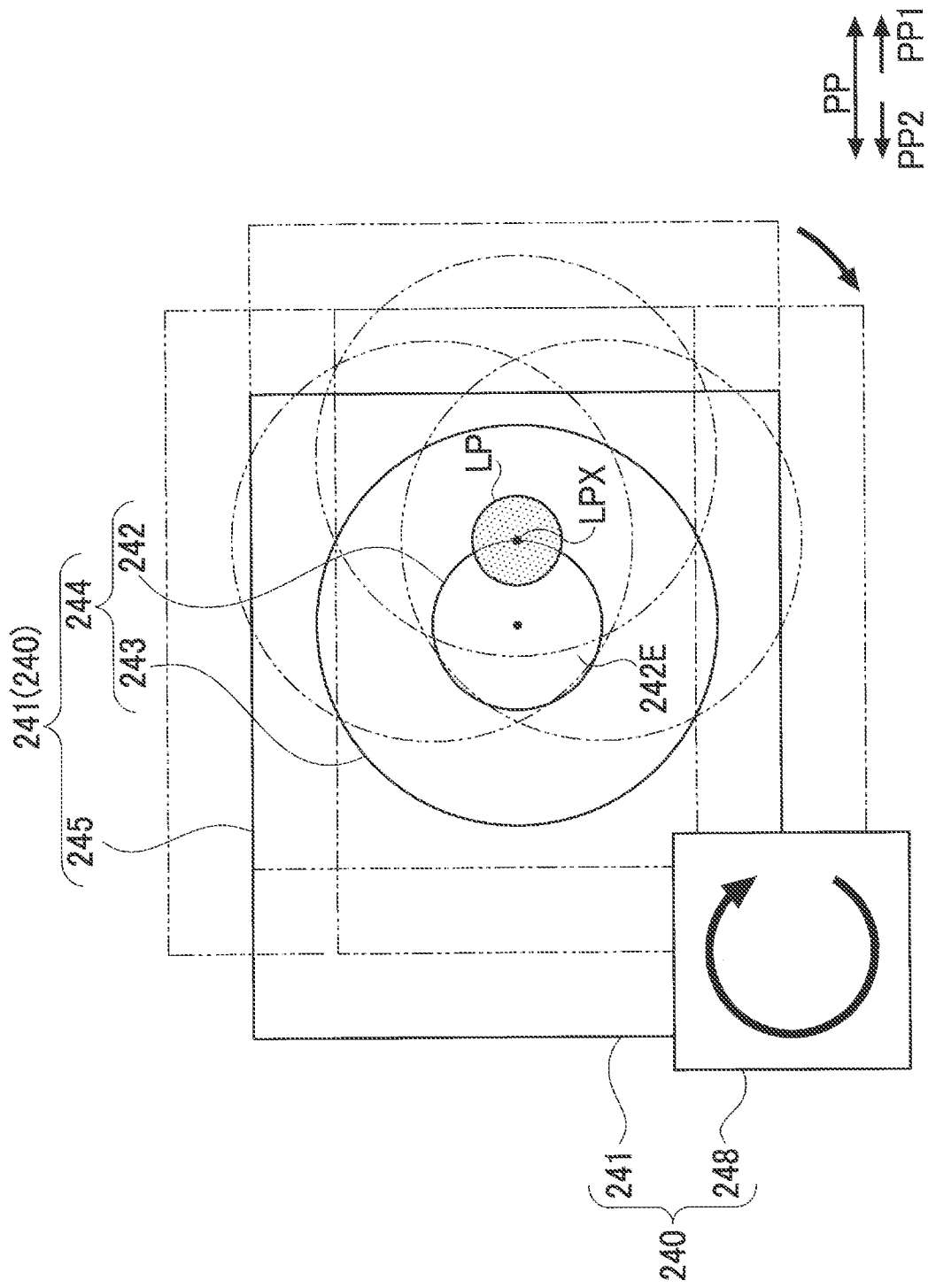
FIG. 17 is a plan view showing the configuration of an element portion including a diffractive optical element member and a circularly moving portion configured to circularly move the diffractive optical element member, and further showing the relationship between the element portion and a parallel laser beam, according to a first modified embodiment.

As shown in FIG. 17, the element portion 240 of the first modified embodiment includes a diffractive optical element member 241 and a circularly moving portion 248 configured to move the diffractive optical element member 241. The diffractive optical element member 241 includes a light transmitting portion 244 through which an incident parallel laser beam LP passes, and a holding portion 245 holding the light transmitting portion 244. The light transmitting portion 244 has a disc shape and is made of quartz glass. A circular region of the light transmitting portion 244 at its central portion is an element forming portion 242 in which a number of diffractive optical elements 242E having a predetermined diffraction pattern are formed by microfabrication. On the other hand, a region around the element forming portion 242 is not formed with a diffractive optical element and is an annular non-forming portion 243 having a flat-plate annular shape and being optically transparent. The element forming portion 242 and the light transmitting portion 244 are concentric with each other.

The diffractive optical elements 242E formed in the element forming portion 242 are formed in a pattern such that when the parallel laser beam LP has entered the element forming portion 242, a diffracted multiple beam LD (LD0 to LD8) composed of a plurality of laser beams arranged as shown in FIG. 6 is produced like in the above-described embodiment.

On the other hand, when the parallel laser beam LP has entered the annular non-forming portion 243, the incident parallel laser beam LP passes through the annular non-forming portion 243 without being diffracted like in the case of the non-forming portion 143 in the above-described embodiment. A transmitted beam LT having passed through the annular non-forming portion 243 is condensed by the condensing portion 120 and proceeds so as to be condensed to a focal point SP of a multiple laser beam LB. In the element portion 240, the diffractive optical element member 241 is located at a position where the parallel laser beam LP is irradiated to a portion overlapping the element forming portion 242 and the annular non-forming portion 243.

The element portion 240 includes the circularly moving portion 248 configured to translate the diffractive optical element member 241 without rotation and to circularly move the diffractive optical element member 241 around an optical axis LPX of the irradiated parallel laser beam LP so as to describe a circle centering on the optical axis LPX. With the movement of the diffractive optical element member 241 by the circularly moving portion 248, as shown in FIG. 17, while the parallel laser beam LP is irradiated to a portion overlapping the element forming portion 242 and the annular non-forming portion 243, a part of the parallel laser beam LP, irradiated to the annular non-forming portion 243, revolves around the optical axis LPX.

Consequently, a multiple laser beam LB that is emitted from the diffractive optical element member 241 always includes a diffracted multiple beam LD (see FIG. 6) and a transmitted beam LT forming a part of a main beam LM. Further, the transmitted beam LT revolves around an optical axis LBX of the multiple laser beam LB according to the circular movement of the diffractive optical element member 241.

Figure 18:
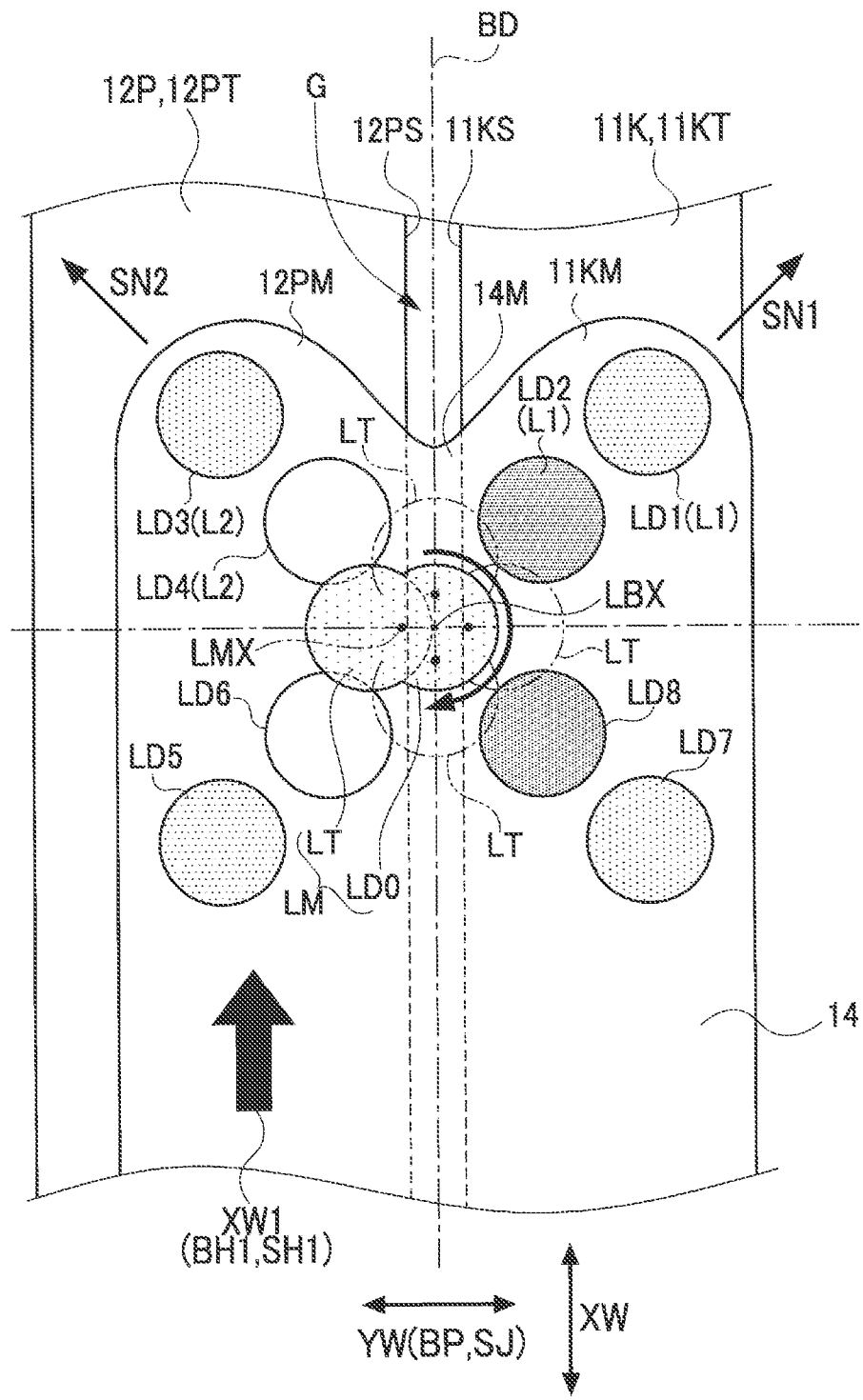
FIG. 18 is an explanatory diagram showing the relationship of a multiple laser beam with a case body and a lid, wherein the multiple laser beam is formed by superimposing a transmitted beam, that moves circularly, on a diffracted multiple beam emitted from an element forming portion (diffractive optical elements) of the diffractive optical element member, according to the first modified embodiment.

Like in the above-described embodiment, when a front focus state, i.e. a first irradiation plane SS1 (indicated by a two-dot chain line) located at a position more on the Z negative direction ZW2 side in the Z-direction ZW (lower side in FIG. 8) than a focal plane SPS, is selected as an irradiation plane to which the multiple laser beam LB is irradiated, the transmitted beam LT revolves around the optical axis LBX on the first irradiation plane SS1 within a range of an integrated molten pool 14M as indicated by solid lines and two-dot chain lines in FIG. 18. The main beam LM swings in the Y-direction YW and in the X-direction XW. Likewise, when a rear focus state, i.e. a second irradiation plane SS2 (indicated by a broken line) located at a position more on the Z positive direction ZW1 side (upper side in FIG. 8) than the focal plane SPS, is selected as an irradiation plane, the transmitted beam LT revolves around the optical axis LBX on the second irradiation plane SS2.

In this way, when the diffractive optical element member 241 is circularly moved by driving the circularly moving portion 248, an optical axis LMX of the main beam LM revolves around the optical axis LBX as shown in FIG. 18. That is, in the longitudinal regions X1, X2, the main beam LM swings across the boundary BD in the Y-direction YW. In the lateral regions Y1, Y2, the main beam LM swings across the boundary BD in the X-direction XW. Then, the integrated molten pool 14M is stirred in each of the cases. When swinging the main beam LM to revolve around the optical axis LBX, it is preferable to revolve the main beam LM at a frequency of three or more revolutions per mm (three or more reciprocations per mm as the number of times of swinging) while the multiple laser beam LB is advanced in the advancing direction BH1 along the boundary BD (e.g. the X positive direction XW1 in the first longitudinal region X1). In this modified embodiment, specifically, the main beam LM is revolved at a frequency of six revolutions per mm.

Consequently, like in the above-described embodiment, as shown in FIG. 15, it is prevented that a film-like oxide layer MOL remains in a welded portion 14. In this way, with the welding method of this modified embodiment, a film-like oxide layer MOL is unlikely to remain in the solidified welded portion 14, so that highly reliable laser welding is made possible. On the other hand, since the diffracted beams LD1 to LD8 such as the first beams L1 and the second beams L2 do not swing in the boundary perpendicular direction, it is possible to suppress the occurrence of laser-passing such that the first beam L1 or the second beam L2 is offset from the opening portion (first boundary portion) 11K of the case body 11 and the peripheral edge portion (second boundary portion) 12P of the lid 12 due to the swing so as to be irradiated to the gap G at the boundary BD.

The description has been given that, as shown in FIG. 18, when laser welding is performed in the longitudinal regions X1, X2 and the lateral regions Y1, Y2 of the boundary BD using the multiple laser beam LB, the laser welding is performed while revolving the main beam LM around the optical axis LBX of the multiple laser beam LB (therefore, while swinging the main beam LM in the Y-direction YW or the X-direction XW). In addition, in the first modified embodiment, also when laser welding is performed in the arc-shaped regions R1 to R4 using the multiple laser beam LB, the laser welding can be performed while revolving the main beam LM using the circularly moving portion 248.

In the laser welding method of the first modified embodiment, since the laser welding is performed by producing the multiple laser beam LB, including the main beam LM that swings so as to revolve, from the parallel laser beam LP by the laser welding apparatus 200, it is not necessary to produce a multiple laser beam using a number of laser light sources, so that the optical configuration can be made simple. That is, in the laser welding apparatus 200, the multiple laser beam LB including the main beam LM that swings is produced from the parallel laser beam LP, so that the optical configuration becomes simple. Further, since the main beam LM swings so as to revolve, it is possible to suppress the formation of a film-like oxide layer MOL in the welded portion 14 by swinging the main beam LM without being affected by selection of the advancing direction SH1 of the multiple laser beam LB.

Second Modified Embodiment

In the above-described embodiment, using the laser welding apparatus 100 including the rectilinear moving portion 148 configured to linearly reciprocate the diffractive optical element member 141 of the element portion 140 between the first position 141A and the second position 141B, the laser welding of the opening portion 11K of the case body 11 and the peripheral edge portion 12P of the lid 12 is performed by swinging the main beam LM in the Y-direction YW when the laser welding is performed in the longitudinal regions X1, X2 and the lateral regions Y1, Y2. The second modified embodiment differs from the above-described embodiment in that a laser welding apparatus 300 including an element portion 340 having no rectilinear moving portion 148 is used to swing a main beam LM by moving the focal position of the Z-lens 125. The other portions are the same as the above-described embodiment. Therefore, different portions will be mainly described, while description of the same portions will be omitted or simplified.

Figure 19:
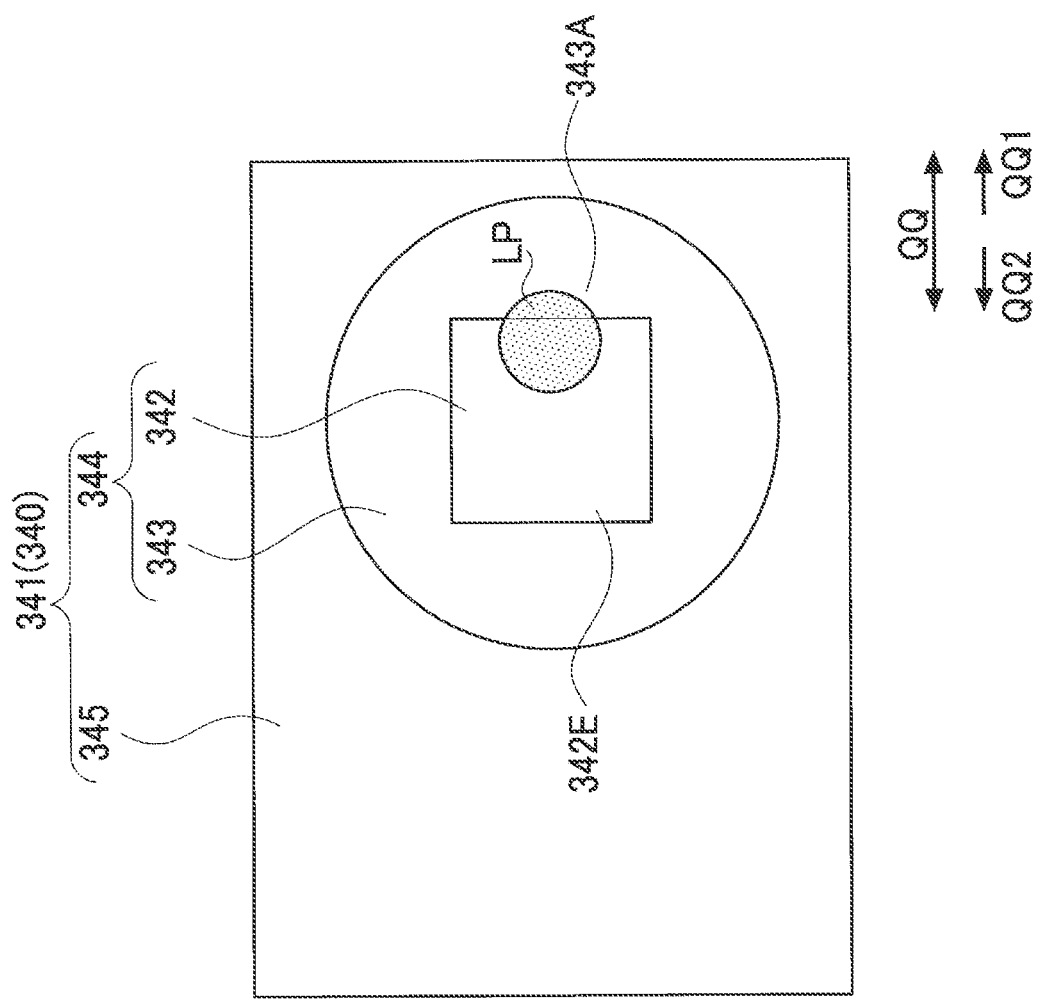
FIG. 19 is a plan view showing the configuration of a diffractive optical element member including an element forming portion and a non-forming portion, and further showing the relationship between the diffractive optical element member and a parallel laser beam, according to a second modified embodiment.

The laser welding apparatus 300 of the second modified embodiment differs from the laser welding apparatus 100 of the above-described embodiment only in the element portion 340. The element portion 340 (see FIG. 19) of the second modified embodiment does not include the rectilinear moving portion 148 of the above-described embodiment, while a diffractive optical element member 341 is the same as the diffractive optical element member 141 of the above-described embodiment. That is, the diffractive optical element member 341 shown in FIG. 19 includes a light transmitting portion 344 through which an incident parallel laser beam LP passes, and a holding portion 345 holding the light transmitting portion 344. A rectangular region of the light transmitting portion 344 at its central portion is an element forming portion 342 formed with a number of diffractive optical elements 342E configured to produce a diffracted multiple beam LD from the parallel laser beam LP, and a region around the element forming portion 342 is a non-forming portion 343 that is optically transparent. In FIG. 19, in the non-forming portion 343, its region adjacent to the right side (one side QQ1 in a swing corresponding direction QQ) of the element forming portion 342 is a first non-forming portion 343A.

Figure 20:
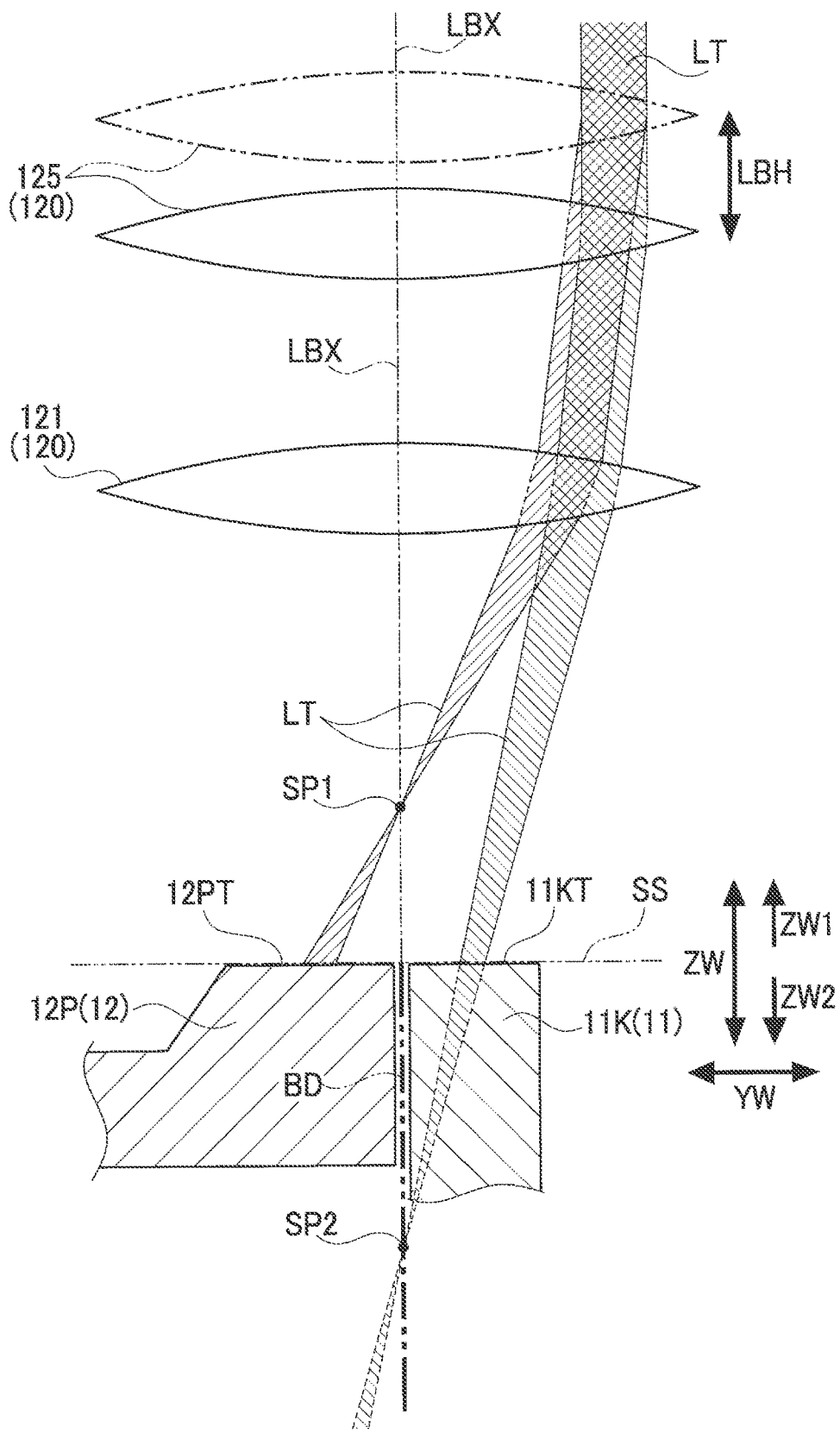
FIG. 20 is an explanatory diagram showing the relationship of a change in condensing position of a transmitted beam due to a movement of a Z-lens, with a case body and a lid, according to the second modified embodiment.

The diffractive optical element member 341 is disposed at a position where the parallel laser beam LP is irradiated to a portion overlapping the element forming portion 342 and the first non-forming portion 343A, so that a transmitted beam LT forming a part of a main beam LM and a diffracted multiple beam LD are emitted as a multiple laser beam LB from the diffractive optical element member 341. As shown in FIG. 20, the parallel laser beam LP having entered the first non-forming portion 343A passes through the first non-forming portion 343A without being diffracted, is condensed by the condensing portion 120 (Z-lens 125, condensing lens 121, etc.), and proceeds so as to be condensed to a focal point of the multiple laser beam LB.

When the Z-lens 125 is driven to move in an optical axis direction LBH, the position of the focal point of the transmitted beam LT (multiple laser beam LB) can be changed to, for example, a first focal point SP1 and a second focal point SP2. On an irradiation plane SS, it seems as if the transmitted beam LT (the main beam LM including the transmitted beam LT) swings by the movement of the Z-lens 125. Therefore, in the second modified embodiment, the diffractive optical element member 341 is disposed by determining the swing corresponding direction QQ such that the direction of swing of the main beam LM (transmitted beam LT) becomes the Y-direction YW that coincides with the boundary perpendicular direction BP perpendicular to the boundary BD in the first longitudinal region X1.

In the second modified embodiment, the case body 11 and the lid 12 are disposed such that the irradiation target surfaces 11KT, 12PT of the opening portion 11K of the case body 11 and the peripheral edge portion 12P of the lid 12 are located in the irradiation plane SS. Then, the Z-lens 125 is driven to move in the optical axis direction LBH so as to cause the focal point of the multiple laser beam LB (transmitted beam LT) to be located at the first focal point SP1 and the second focal point SP2 alternately. Consequently, for example, when the focal point of the multiple laser beam LB (transmitted beam LT) is front focus relative to the irradiation plane SS, i.e. is located at the first focal point SP1 located at a position more on the Z positive direction ZW1 side (light source side) than the irradiation plane SS, the transmitted beam LT passes through the first focal point SP1 and hits the irradiation target surface 12PT of the peripheral edge portion 12P of the lid 12. On the other hand, when the focal point of the multiple laser beam LB (transmitted beam LT) is rear focus relative to the irradiation plane SS, i.e. is located at the second focal point SP2 located at a position more on the Z negative direction ZW2 side than the irradiation plane SS, the transmitted beam LT hits the irradiation target surface 11KT of the opening portion 11K of the case body 11.

That is, by the movement of the Z-lens 125 in the optical axis direction LBH, like in the above-described embodiment, the multiple laser beam LB is irradiated to the irradiation target surface 11KT of the opening portion 11K of the case body 11 and the irradiation target surface 12PT of the peripheral edge portion 12P of the lid 12, and the main beam LM swings across the boundary BD in the Y-direction YW as shown in FIGS. 10, 13, and 14. Consequently, an integrated molten pool 14M is stirred. In this way, also in the second modified embodiment, as shown in FIG. 15, a film-like oxide layer MOL (see FIG. 21) is unlikely to be formed in the solidified welded portion 14, so that highly reliable laser welding is made possible. On the other hand, since the diffracted multiple beam LD (zero-order light beam LD0, diffracted beams LD1 to LD8) does not swing, it is possible to suppress the occurrence of laser-passing such that the first beam L1 or the second beam L2 is offset from the opening portion (first boundary portion) 11K of the case body 11 and the peripheral edge portion (second boundary portion) 12P of the lid 12 so as to be irradiated to the gap G at the boundary BD.

Also in the second modified embodiment, when swinging the main beam LM, it is preferable to reciprocate the main beam LM at a frequency of three or more reciprocations per mm while the multiple laser beam LB is advanced in the advancing direction BH1 along the boundary BD (e.g. the X positive direction XW1 in the first longitudinal region X1). Also in this modified embodiment, specifically, the main beam LM is reciprocated at a frequency of six reciprocations per mm.

Also in the second modified embodiment, when laser welding is performed in the longitudinal regions X1, X2 and the lateral regions Y1, Y2 of the boundary BD using the multiple laser beam LB, the laser welding is performed while swinging the main beam LM in the Y-direction YW.

In the laser welding method of the second modified embodiment, since the laser welding is performed by producing the multiple laser beam LB, including the main beam LM that swings, from the parallel laser beam LP by the laser welding apparatus 300, it is not necessary to produce a multiple laser beam using a number of laser light sources, so that the optical configuration can be made simple. Further, since it is not necessary to provide the element portion 340 with a movable portion such as the rectilinear moving portion 148 of the above-described embodiment, the optical configuration can be made further simple in this regard.

While the disclosure has been described with reference to the embodiment and the first and second modified embodiments, it is needless to say that the disclosure is not limited to the above-described embodiment and modified embodiments and can be applied with appropriate changes within a range not departing from the gist of the disclosure. In the above-described embodiment and modified embodiments, use is made of the diffractive optical element members 141, 241, 341 each including the element forming portion formed with the diffractive optical elements having a pattern such that a zero-order light beam LD0 and eight diffracted beams LD1 to LD8 are formed. However, it is satisfactory if a first beam L1, a second beam L2, and a main beam LM that swings are provided. For example, a diffracted multiple beam LD may have a pattern that is not composed of nine beams, but is composed of a central zero-order light beam and four primary light beams around the zero-order light beam. Further, in the above-described embodiment and modified embodiments, laser welding is performed fully annularly. However, a pattern of laser welding can be selected as appropriate, such as, for example, a linear pattern or an L-shaped pattern, and laser welding may be performed while swinging a main beam in at least a part of a series of laser welding operations.

What is claimed is:

1. A laser welding apparatus comprising:
a light source portion configured to form a parallel laser beam;
an element portion including a diffractive optical element member and configured to form a multiple laser beam composed of a plurality of beams from the parallel laser beam incident on the diffractive optical element member;
a condensing portion configured to condense the multiple laser beam; and
a deflecting portion configured to deflect the multiple laser beam, wherein:
the multiple laser beam includes at least a main beam, a first beam that has an energy lower than an energy of the main beam and is irradiated so as to be spaced apart from the main beam in a first obliquely front direction in an advancing direction of the multiple laser beam, and a second beam that has an energy lower than the energy of the main beam and is irradiated so as to be spaced apart from the main beam in a second obliquely front direction in the advancing direction of the multiple laser beam, the second obliquely front direction being a direction that is inclined to a side opposite to the first obliquely front direction in the advancing direction;
the diffractive optical element member includes an element forming portion formed with a diffractive optical element, a first non-forming portion that is disposed adjacent to the element forming portion on a first side in a moving direction of the element forming portion and is not formed with the diffractive optical element, and a second non-forming portion that is disposed adjacent to the element forming portion on a second side opposite to the first side in the moving direction of the element forming portion and is not formed with the diffractive optical element, the element forming portion is configured to emit a diffracted multiple beam from the parallel laser beam using the diffractive optical element, the diffracted multiple beam composed of a plurality of beams including the first beam and the second beam in the multiple laser beam, the first non-forming portion is configured to emit a first transmitted beam as at least a part of the main beam of the multiple laser beam, the first transmitted beam being the parallel laser beam having passed through the first non-forming portion without being diffracted, and the second non-forming portion is configured to emit a second transmitted beam as at least a part of the main beam of the multiple laser beam, the second transmitted beam being the parallel laser beam having passed through the second non-forming portion without being diffracted; and
the element portion includes a rectilinear moving portion configured to linearly reciprocate the diffractive optical element member in the moving direction between a first position where the parallel laser beam is irradiated to a portion overlapping the first non-forming portion and the element forming portion such that the multiple laser beam including the first transmitted beam forming at least the part of the main beam and the diffracted multiple beam is emitted, and a second position where the parallel laser beam is irradiated to a portion overlapping the element forming portion and the second non-forming portion such that the multiple laser beam including the diffracted multiple beam and the second transmitted beam forming at least the part of the main beam is emitted.

2. A laser welding apparatus comprising:

a light source portion configured to form a parallel laser beam;

an element portion including a diffractive optical element member and configured to form a multiple laser beam composed of a plurality of beams from the parallel laser beam incident on the diffractive optical element member;

a condensing portion configured to condense the multiple laser beam; and a deflecting portion configured to deflect the multiple laser beam, wherein:

the multiple laser beam includes at least a main beam, a first beam that has an energy lower than an energy of the main beam and is irradiated so as to be spaced apart from the main beam in a first obliquely front direction in an advancing direction of the multiple laser beam, and a second beam that has an energy lower than the energy of the main beam and is irradiated so as to be spaced apart from the main beam in a second obliquely front direction in the advancing direction of the multiple laser beam, the second obliquely front direction being a direction that is inclined to a side opposite to the first obliquely front direction in the advancing direction;

the diffractive optical element member includes an element forming portion formed with a diffractive optical element, and a non-forming portion that surrounds the element forming portion and is not formed with the diffractive optical element, the element forming portion is configured to emit a diffracted multiple beam from the parallel laser beam using the diffractive optical element, the diffracted multiple beam composed of a plurality of beams including the first beam and the second beam in the multiple laser beam, and the non-forming portion is annular and is configured to emit a transmitted beam as at least a part of the main beam of the multiple laser beam, the transmitted beam being the parallel laser beam having passed through the non-forming portion without being diffracted; and the diffractive optical element member is disposed such that the parallel laser beam is irradiated to a portion overlapping the element forming portion being circular and the non-forming portion in a circumferential direction, and the element portion includes a circularly moving portion configured to circularly move the diffractive optical element member around an optical axis of the parallel laser beam without rotating the diffractive optical element member.

* * * * *